United States Patent
Kobori

(10) Patent No.: US 6,804,314 B2
(45) Date of Patent: Oct. 12, 2004

(54) SYNCHRONISM JUDGMENT APPARATUS AND COMMUNICATION SYSTEM

(75) Inventor: Satoshi Kobori, Sendai (JP)

(73) Assignee: Fujitsu Limited, Kawasaki (JP)

( * ) Notice: Subject to any disclaimer, the term of this patent is extended or adjusted under 35 U.S.C. 154(b) by 806 days.

(21) Appl. No.: 09/804,493

(22) Filed: Mar. 12, 2001

(65) Prior Publication Data

US 2002/0044619 A1 Apr. 18, 2002

(30) Foreign Application Priority Data

Oct. 13, 2000 (JP) ......................................... 2000-313972

(51) Int. Cl.[7] ................................................. H04L 7/00
(52) U.S. Cl. ..................................... 375/354; 370/503
(58) Field of Search ................................. 375/354, 355, 375/359, 377; 370/503, 507, 509, 512

(56) References Cited

U.S. PATENT DOCUMENTS 5,228,036 A * 7/1993 Okamoto et al. ........... 370/514
5,592,518 A * 1/1997 Davis et al. ................ 375/368
6,618,458 B1 * 9/2003 Nishimura .................. 375/364

* cited by examiner

Primary Examiner—Jean B. Corrielus
(74) Attorney, Agent, or Firm—Katten Muchin Zavis Rosenman

(57) ABSTRACT

The invention relates to a synchronism judgment apparatus for judging establishment of synchronization with a frame received as a sequence of consecutive slots to which sync patterns are dispersively distributed in a form commensurate with the receiving mode according to a standard suitable for one of a plurality of receiving modes, as well as to a communication system where such a synchronism judgment apparatus is employed. The synchronism judgment apparatus of the invention enables judgment of establishment of synchronization with accuracy compared to a conventional example as long as the above standard is reliably given or identified. Therefore, in a communication system to which the invention is applied, it is possible to maintain the transmission quality and the service quality high and flexibly adapt to a variety of communication services and transmission rates, and the transmission information quantity that may vary to a large extent.

22 Claims, 14 Drawing Sheets

FIG. 3

| SLOT IDENTIFIER | PILOT WORD LENGTH [BITS/SLOT] | NUMBER OF VALID SLOTS | TOTAL NUMBER OF PILOT BITS PACKED IN EACH FRAME [BITS/FRAME] |
|---|---|---|---|
| 0 | 6 | 15 | 90 |
| 0A | 5 | 10~14 | 50~70 |
| 0B | 4 | 8~9 | 32~36 |
| 1 | 8 | 8~15 | 64~120 |
| 2 | 5 | 15 | 75 |
| 2A | 4 | 10~14 | 40~56 |
| 2B | 3 | 8~9 | 24~27 |
| 3 | 7 | 8~15 | 56~75 |
| 4 | 6 | 8~15 | 48~90 |
| 5 | 5 | 15 | 75 |
| 5A | 4 | 10~14 | 40~56 |
| 5B | 3 | 8~9 | 24~27 |

F I G. 4
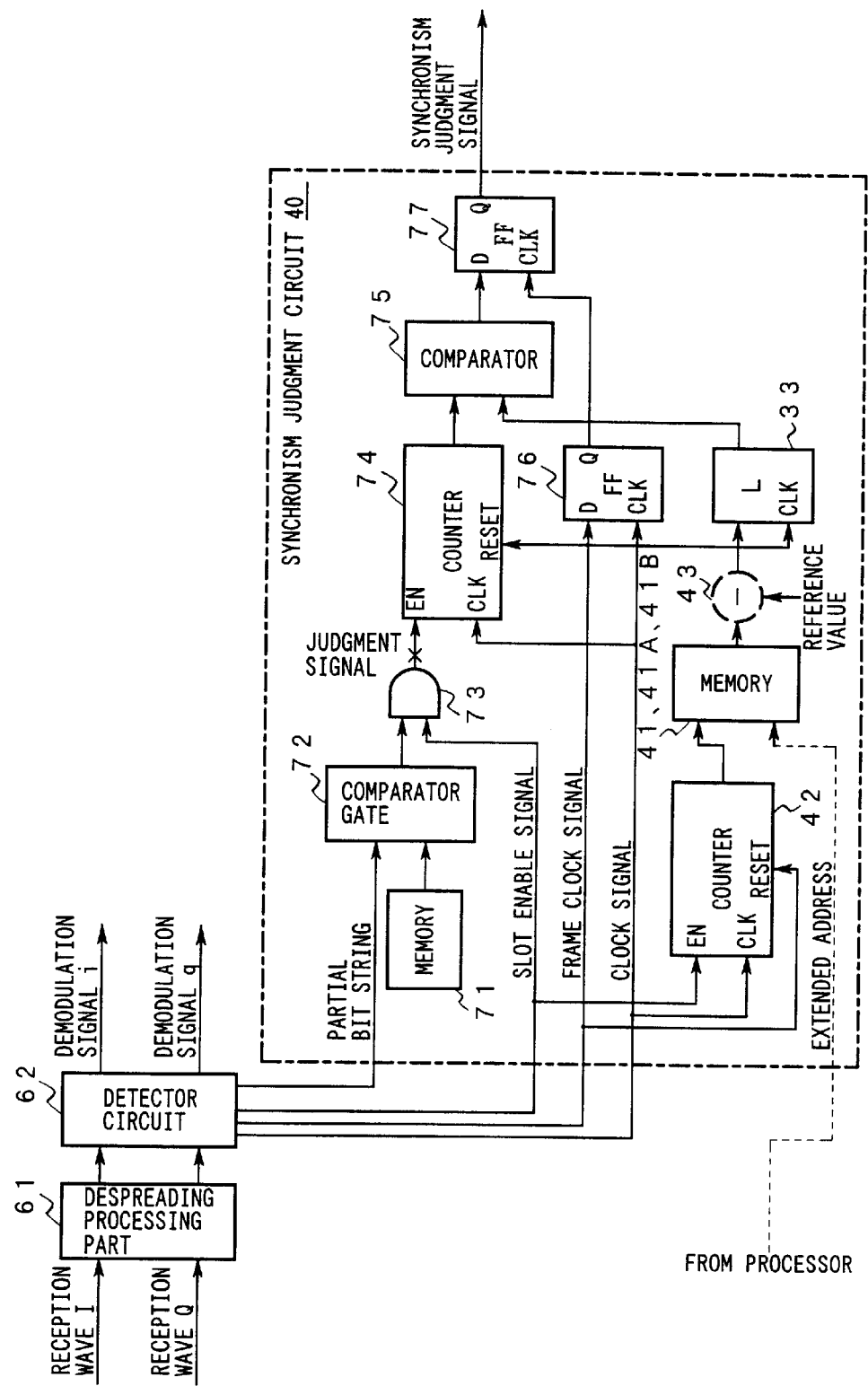

| NUMBER OF SLOTS S (ADDRESS) | NUMBER OF BITS Nb |
|---|---|
| 0 | |
| 1 | |
| 2 | |
| 3 | |
| 4 | |
| 5 | 5(=Nc) |
| 6 | |
| 7 | |
| 8 | |
| 9 | |
| 10 | |
| 11 | |
| 12 | |
| 13 | |
| 14 | |
| 15 | 10(=Nn) |

EXTENDED ADDRESS (b)

| NUMBER OF SLOTS S (ADDRESS) | NUMBER OF BITS Nb |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | |
| 10 | 9 |
| 11 | |
| 12 | |
| 13 | |
| 14 | |
| 15 | 10 |

(c)

| NUMBER OF SLOTS S (ADDRESS) | DIFFERENCE |
|---|---|
| 0 | |
| 1 | |
| 2 | |
| 3 | |
| 4 | |
| 5 | 5 |
| 6 | |
| 7 | |
| 8 | |
| 9 | |
| 10 | |
| 11 | |
| 12 | |
| 13 | |
| 14 | |
| 15 | 0 |

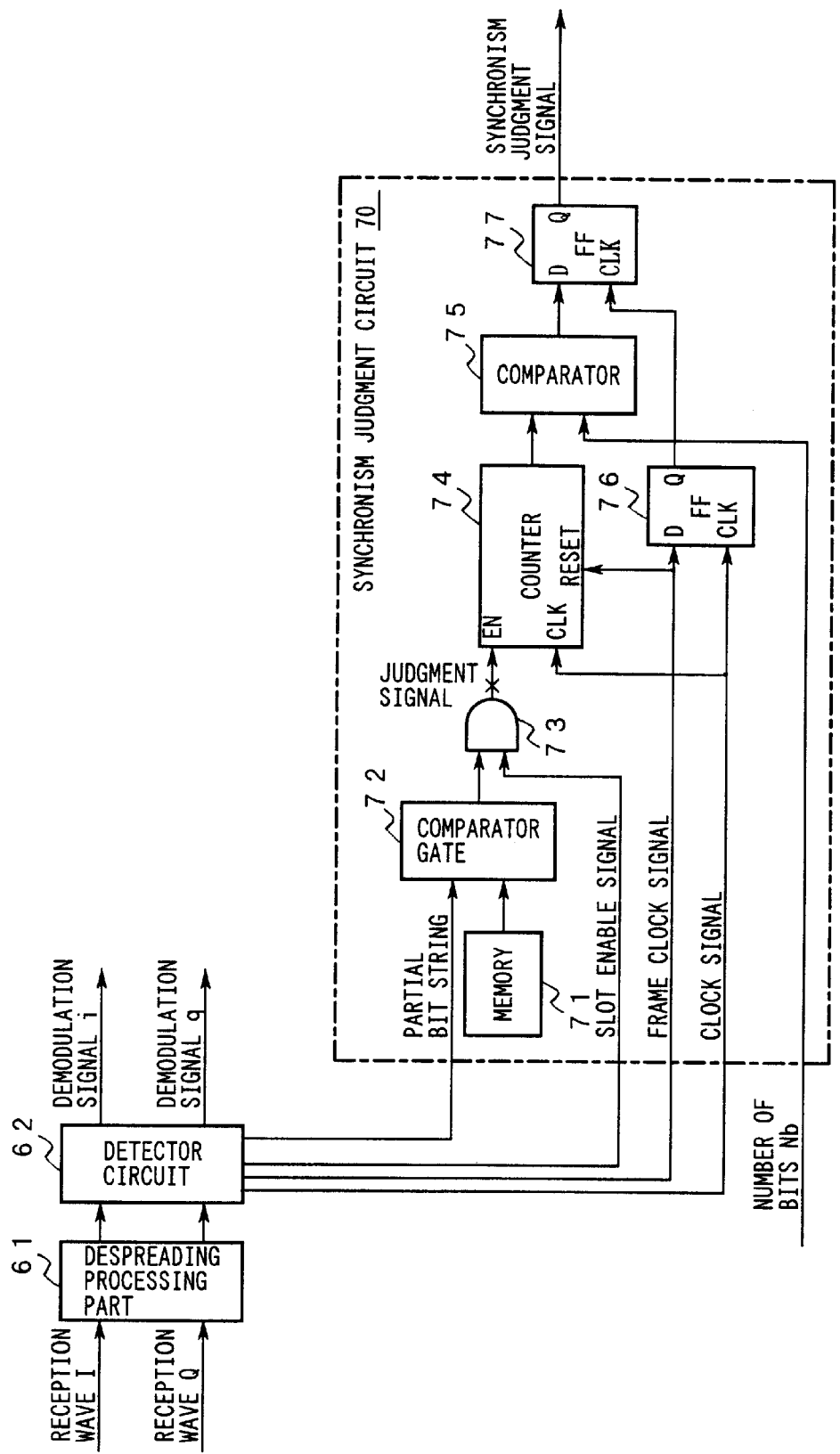
PRIOR ART FIG. 10

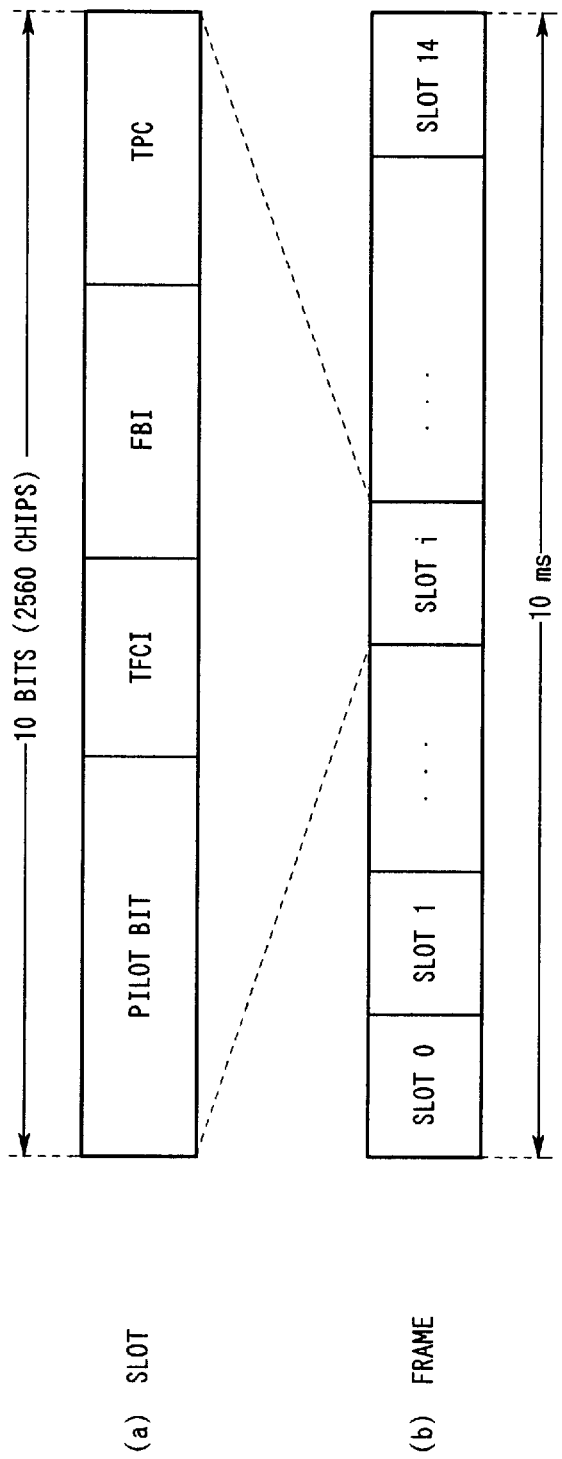

PRIOR ART FIG. 12

| WORD LENGTH | 3 BITS | | | 4 BITS | | | 5 BITS | | | | 6 BITS | | | | | 7 BITS | | | | | | 8 BITS | | | | | | | |
|---|---|---|---|---|---|---|---|---|---|---|---|---|---|---|---|---|---|---|---|---|---|---|---|---|---|---|---|---|---|
| BIT NUMBER | 0 | 1 | 2 | 0 | 1 | 2 | 3 | 0 | 1 | 2 | 3 | 4 | 0 | 1 | 2 | 3 | 4 | 5 | 0 | 1 | 2 | 3 | 4 | 5 | 6 | 0 | 1 | 2 | 3 | 4 | 5 | 6 | 7 |
| 0 | 1 | 1 | 1 | 0 | 1 | 1 | 1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 0 |
| 1 | 0 | 0 | 1 | 1 | 0 | 0 | 1 | 0 | 0 | 1 | 1 | 0 | 1 | 0 | 1 | 1 | 1 | 0 | 0 | 0 | 1 | 1 | 1 | 1 | 1 | 0 | 1 | 1 | 1 | 1 | 1 | 1 | 0 |
| 2 | 0 | 1 | 1 | 1 | 0 | 1 | 1 | 1 | 1 | 0 | 0 | 1 | 0 | 1 | 0 | 1 | 0 | 1 | 0 | 0 | 0 | 1 | 0 | 1 | 1 | 0 | 0 | 1 | 0 | 1 | 0 | 1 | 1 |
| 3 | 0 | 0 | 1 | 1 | 1 | 1 | 1 | 0 | 1 | 1 | 0 | 0 | 0 | 1 | 1 | 1 | 0 | 1 | 1 | 0 | 1 | 1 | 0 | 1 | 1 | 0 | 0 | 1 | 0 | 1 | 0 | 1 | 1 |
| 4 | 1 | 1 | 1 | 1 | 1 | 1 | 1 | 1 | 0 | 1 | 0 | 1 | 1 | 1 | 1 | 1 | 0 | 0 | 1 | 0 | 1 | 1 | 0 | 0 | 1 | 0 | 0 | 1 | 1 | 1 | 0 | 1 | 0 |
| 5 | 0 | 1 | 1 | 1 | 1 | 0 | 1 | 0 | 1 | 1 | 0 | 0 | 0 | 1 | 0 | 1 | 1 | 1 | 0 | 1 | 1 | 1 | 1 | 0 | 1 | 1 | 0 | 1 | 0 | 1 | 1 | 1 | 0 |
| 6 | 1 | 0 | 1 | 1 | 1 | 0 | 1 | 1 | 0 | 1 | 1 | 0 | 1 | 1 | 1 | 1 | 0 | 0 | 1 | 0 | 0 | 1 | 0 | 0 | 1 | 1 | 0 | 1 | 0 | 0 | 0 | 1 | 0 |
| 7 | 1 | 1 | 1 | 1 | 1 | 1 | 1 | 1 | 1 | 1 | 1 | 0 | 1 | 1 | 1 | 1 | 1 | 1 | 1 | 1 | 1 | 1 | 0 | 1 | 1 | 1 | 0 | 1 | 0 | 1 | 0 | 1 | 0 |
| 8 | 1 | 1 | 1 | 1 | 1 | 0 | 1 | 1 | 0 | 1 | 0 | 1 | 1 | 0 | 1 | 1 | 1 | 1 | 1 | 0 | 1 | 1 | 1 | 0 | 1 | 1 | 0 | 1 | 0 | 1 | 1 | 1 | 1 |
| 9 | 0 | 0 | 1 | 1 | 1 | 0 | 1 | 0 | 0 | 1 | 1 | 0 | 0 | 1 | 0 | 1 | 1 | 1 | 0 | 1 | 0 | 1 | 1 | 0 | 1 | 1 | 0 | 1 | 1 | 1 | 0 | 1 | 1 |
| 10 | 0 | 1 | 1 | 1 | 1 | 1 | 1 | 1 | 1 | 1 | 1 | 0 | 1 | 1 | 0 | 1 | 1 | 1 | 1 | 1 | 0 | 1 | 1 | 1 | 1 | 1 | 1 | 1 | 1 | 1 | 0 | 1 | 1 |
| 11 | 0 | 0 | 1 | 1 | 1 | 0 | 1 | 0 | 0 | 1 | 0 | 1 | 0 | 0 | 0 | 1 | 1 | 1 | 0 | 0 | 0 | 1 | 1 | 0 | 1 | 1 | 1 | 1 | 0 | 1 | 1 | 1 | 1 |
| 12 | 0 | 0 | 1 | 1 | 0 | 0 | 1 | 1 | 0 | 1 | 0 | 0 | 1 | 1 | 0 | 1 | 0 | 0 | 0 | 1 | 0 | 1 | 1 | 1 | 1 | 0 | 0 | 1 | 0 | 0 | 1 | 1 | 0 |
| 13 | 0 | 0 | 1 | 1 | 0 | 0 | 1 | 0 | 0 | 1 | 0 | 1 | 0 | 1 | 0 | 1 | 1 | 1 | 0 | 1 | 0 | 1 | 1 | 0 | 1 | 1 | 0 | 1 | 0 | 1 | 1 | 1 | 1 |
| 14 | 0 | 1 | 1 | 0 | 1 | 0 | 1 | 0 | 0 | 1 | 1 | 1 | 0 | 0 | 0 | 1 | 1 | 1 | 0 | 0 | 1 | 1 | 1 | 1 | 1 | 0 | 0 | 1 | 0 | 1 | 1 | 1 | 1 |

SLOT NUMBER

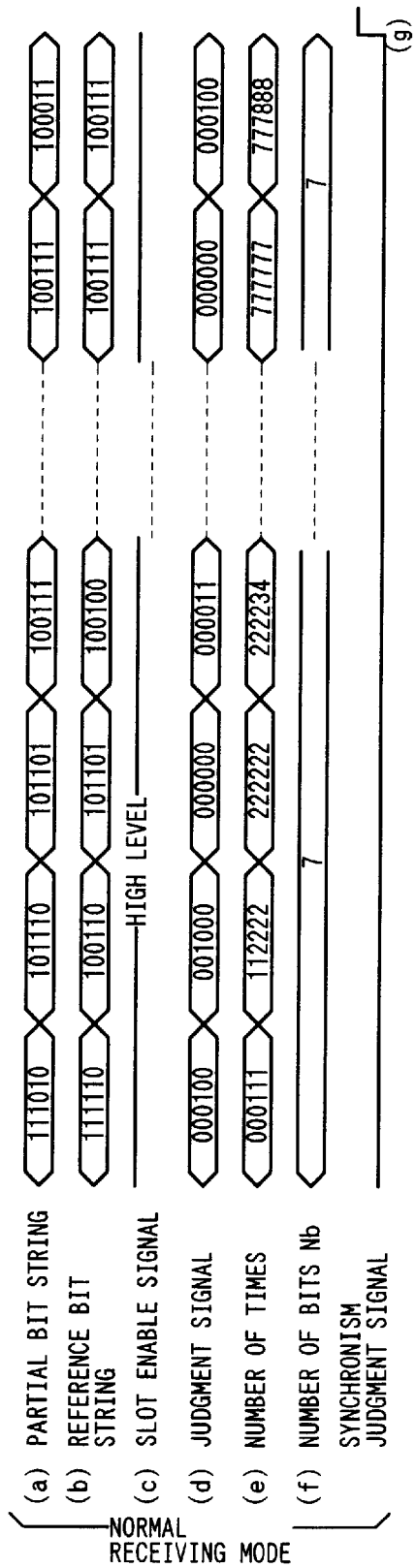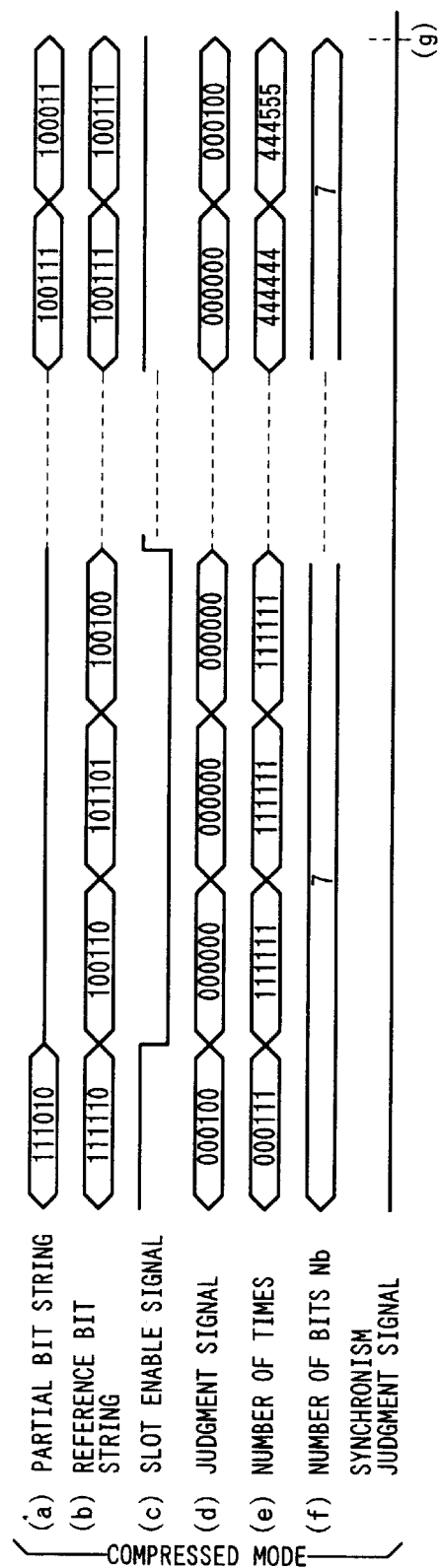
PRIOR ART FIG. 13

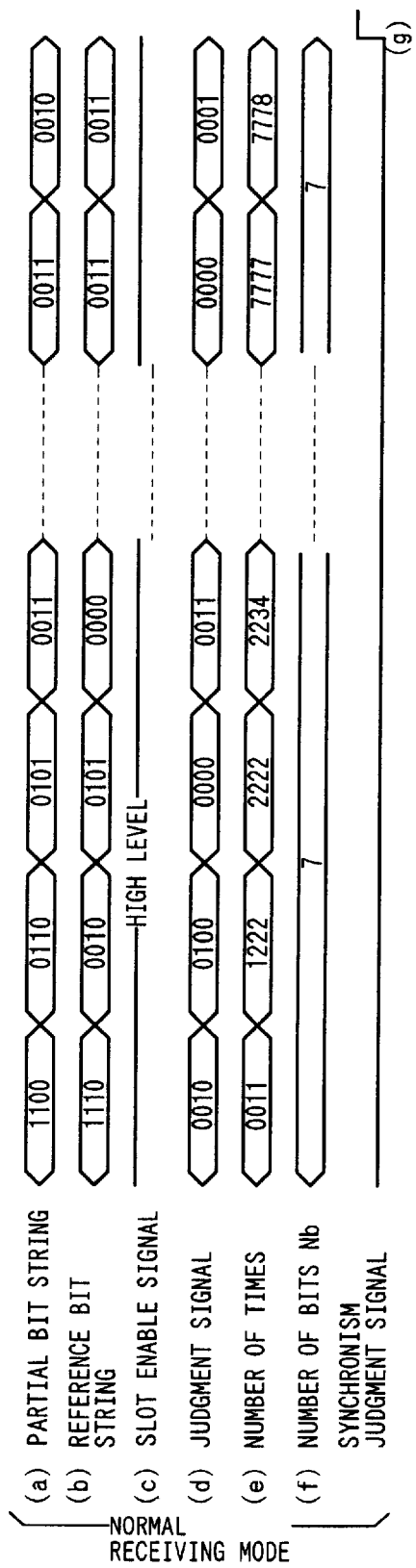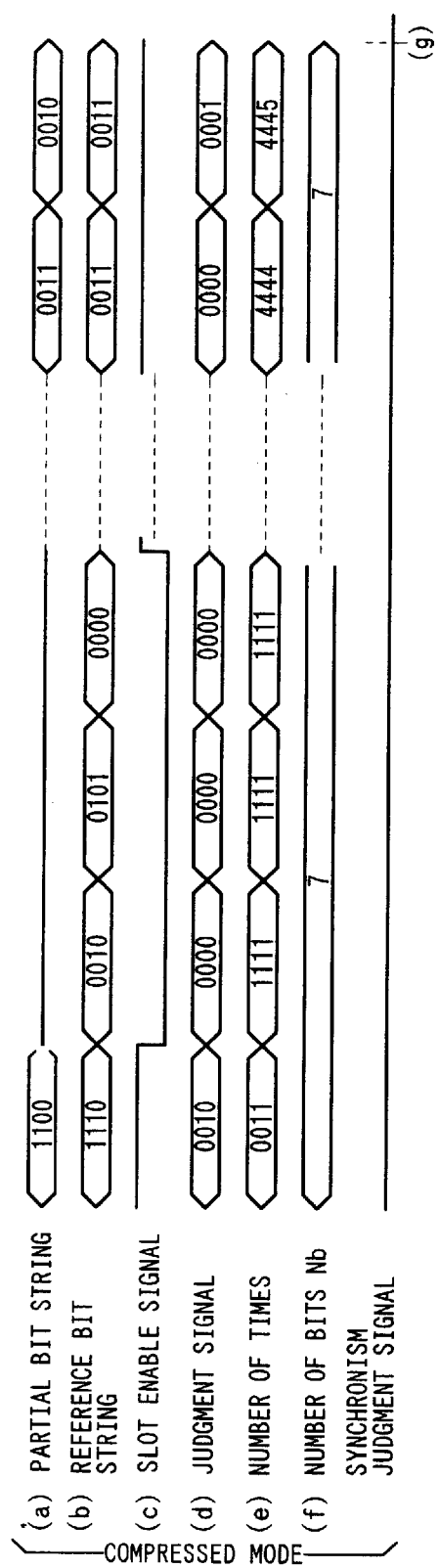
PRIOR ART FIG. 14

SYNCHRONISM JUDGMENT APPARATUS AND COMMUNICATION SYSTEM

BACKGROUND OF THE INVENTION

1. Field of the Invention

The present invention relates to a synchronism judgment apparatus for judging whether frame synchronization has been established in a transmission system in which frame synchronization with respect to frames as a sequence of slots to which sync patterns are distributed according to the sync patterns, as well as to a communication system where such a synchronism judgment apparatus is applied.

2. Description of the Related Art

Conventionally, in the field of mobile communication, various systems have been constructed in order to deal with differences in transmission information, communication form, service to be provided, etc. And extensive researches and developments have been made to exploit new technologies.

Among those technologies, the CDMA (code division multiple access) is applied positively to next-generation mobile communication systems as a promising wide-band multiple access method because it offers a high degree of confidentiality, has such properties that a communication is less affected by interference/disturbance and fluctuations such as frequency selective fading in radio transmission channel, and enables flexible adaptation to differences of the above kind.

FIG. 10 shows the configuration of an exemplary receiving part that is provided in a radio base station of a CDMA mobile communication system.

As shown in FIG. 10, two reception waves I and Q that were subjected in parallel to spreading processing with orthogonal spreading codes in a transmitting end and have occupied bands in a prescribed band (for simplicity, it is assumed here to be a baseband) are supplied to a despreading processing part 61 in parallel. The two outputs of the despreading part 61 are connected to the respective inputs of a detector circuit 62. Demodulation signals i and q corresponding to the two respective reception waves I and Q are obtained at the two outputs of the detector circuit 62. The monitoring output and the first to third control outputs of the detector circuit 62 are connected to the first to fourth inputs of a synchronism judgment circuit 70, respectively. The number of bits Nb (described later) is supplied externally to the fifth input of the synchronism judgment circuit 70. A synchronism judgment signal is output to the output of the synchronism judgment circuit 70.

The synchronism judgment circuit 70 is composed of the following components:

A memory 71 in which known sync pattern (hereinafter referred to as "reference bit string") to be received are stored in advance.

A comparator gate 72 having two inputs that are connected to the output of the memory 71 and the monitoring output of the detector circuit 62, respectively.

An AND gate 73 having two inputs that are connected to the output of the comparator 72 and the first control output of the detector circuit 62.

A counter 74 having an enable terminal EN to which the output of the AND gate 73 is connected and a clock terminal CLK and a reset terminal RESET to which the second and third outputs of the detector circuit 62 are connected, respectively.

A comparator 75 having one input to which the output of the counter 74 is connected and the other input to which the number of bits Nb is supplied.

A flip-flop 76 having a clock terminal CLK that is connected to the second output of the detector circuit 62 together with the clock terminal CLK of the counter 74 and a D input that is connected to the third output of the detector circuit 62 together with the reset terminal RESET of the counter 74.

A flip-flop 77 provided at the final stage and having a D input that is connected to the output of the comparator 75 and a clock terminal CLK that is directly connected to the non-inverting output Q of the flip-flop 76.

In the conventional example having the above configuration, so that processing for realizing a transmission power control and setting and updating of a variety of transmission rates and transmission forms that are suitable for channel allocation, zone configuration, etc. can be performed repeatedly in time series at a prescribed cycle in each of a mobile station and the radio base station, of the above-mentioned reception waves I and Q, the reception wave Q that is received through a control channel (DPCCH) used for transmission of control information from the mobile station to the radio base station according to a channel control is given as a reception wave that is modulated with a sequence of frames (slots) described below.

As shown in FIG. 11A, each slot is composed of four fields containing the following information. The word length of each slot is 10 bits (corresponding to 2,560 chip cycles) irrespective of the values of those fields.

"Pilot bits" to be used as a sync pattern.

"TFCI bits" indicating a communication speed.

"FBI bits" to be used for controlling transmission diversity for a downlink.

"TPC bits" indicating the form of transmission power control to be performed for a downlink.

As shown further in FIG. 11, each frame is configured in such a manner that 15 slots (in the maximum case) as described above are packed in order of time series. The length of each frame is 10 ms irrespective of the number of slots actually packed.

As shown in FIG. 12, the "pilot bits" field accommodates a known bit string (hereinafter referred to as "sync pattern") that has a word length of 3 to 8 bits and varies depending on a "slot number" that indicates a packing position of the associated slot in the frame.

Among the bits that constitute each sync pattern, bits that are halftone-dot-meshed in FIG. 12 will be referred to below simply as "FSW (frame sync-word) bits."

The despreading processing part 61 performs despreading processing on the above-mentioned reception waves I and Q in parallel. The detector circuit 62 outputs the following demodulation signals i and q by demodulating in parallel two signals obtained by the despreading.

A demodulation signal i indicating, in the form of a sequence of prescribed frames, transmission information (corresponding to a speech signal or the like) received through a data channel (DPDCH).

A demodulation signal q indicating, in the form of a sequence of frames as described above (see FIG. 11), control information received through a control channel (DPCCH; mentioned above).

In the demodulation processing that is performed in the detector circuit 62 to generate those demodulation signals i and q, phase rotation that has occurred in an upstream radio transmission path from a mobile station to the radio base station is corrected. However, the procedure of such demodulation processing is not an essential feature of the invention and can be realized by using various known technologies, and hence will not be described.

Since the bit string obtained as a demodulation signal q by the above demodulation processing is bit-synchronized with the reception wave Q, the detector circuit 62 performs the following processing by operating independently to divide the bit string according to the above-described frame configuration.

Extracting a bit string that can be regarded as a frame (hereinafter referred to as "interim frame" because it does not necessarily coincide with a true frame) by operating independently to divide the above-mentioned bit string into parts each having the above-mentioned frame word length.

Extracting partial bit strings each of which can be regarded as a sync pattern from the bit string constituting the interim frame according to the frame configuration shown in FIG. 11B and FIG. 12. It is assumed that the number of bits included in such a partial bit string conforms to and is proportional to the actual word length (3 to 8 bits) of a sync pattern.

Generating a frame clock signal that rises at the head of the interim frame and a slot enable signal that is an NRZ signal whose logical value becomes "1" only in the periods of valid slots included in the interim frame.

The known bit strings (see FIG. 12; hereinafter referred to as "reference bit strings") to be received as pilot bit strings of slots that are packed in each frame in a state that frame synchronization is established are stored in advance in the memory 71 of the synchronism judgment circuit 70.

The comparator 72 judges, sequentially, bit by bit, whether each of partial bit strings (see parts (a) of FIG. 13) is the same as a reference bit string (see parts (b) of FIG. 13) stored in the memory 71, and outputs binary information indicating a result of the judgment.

The AND gate 73 supplies the counter 74 with a judgment signal (see parts (d) of FIG. 13) that consists of bit strings corresponding to respective valid slots that are indicated by the above-mentioned slot enable signal (see parts (c) of FIG. 13).

The counter 74 is reset at the end of each interim frame according to the frame clock signal. By sampling and recognizing the logical values of the judgment signal in synchronism with the clock signal, the counter 74 counts, for each interim frame cycle, the number of times the result of the judgment performed by the comparator 72 is "false" for only valid slots.

The comparator 75 judges whether the above number of times (see parts (e) of FIG. 13) is less than or equal to the number of bits Nb given as a fixed number as mentioned above (see parts (f) of FIG. 13), and outputs a synchronism judgment signal (see parts (g) of FIG. 13) indicating a result of the judgment.

The flip-flop 77 samples the synchronism judgment signal at the leading edge (or trailing edge) of the frame clock signal that is synchronized with the clock signal by the flip-flop 76, and outputs it.

Therefore, establishment of or pulling out of frame synchronization is properly judged as long as the number of bits Nb is a proper value, and hunting, backward alignment guard, and forward alignment guard that are necessary for establishment and maintaining of frame synchronization can be performed smoothly based on a result of the synchronism judgment.

In the above conventional example, all sync patterns that are distributed to respective slots are collated with the known reference bit strings.

However, for example, the collation may be performed for only FSW bits (mentioned above) that are included in sync patterns in a manner shown in FIG. 14B.

Incidentally, in the above conventional example, the number of bits Nb is set at a fixed value though the number of valid slots that are packed in each frame is smaller than 15 in the following two modes:

A burst receiving mode in which frames that are transmitted intermittently from a mobile station where a certain call (including a call for location registration) occurred and each of which is a sequence of slots indicating control information are to be received.

A compressed mode in which transmission information that is transmitted in compressed form are to be received in order to access in parallel a TDMA mobile communication system and a wide-band CDMA mobile communication system by sharing a single frequency synthesizer in dual mode mobile station.

That is, although the ratio of the number of bits Nb to the number of valid slots is proper in a continuous receiving mode in which the number of valid slots that are packed in each frame is always equal to 15, it becomes an unduly large value in the above burst receiving mode and compressed mode.

Therefore, in the burst receiving mode and the compressed mode, even when the reception wave Q does not vary in quality, the channel control may not be necessarily performed properly since the judgment standard of establishment of frame synchronization is alleviated and the accuracy of the above judgment and the service quality is lowered.

SUMMARY OF THE INVENTION

An object of the present invention is to provide a synchronism judgment apparatus and a communication system which enables a proper synchronism judgment while flexibly adapting to various configurations of frames transmitted via a radio transmission path.

Another object of the invention is to adapt to each receiving mode with flexibility and judge whether frame synchronization has been established with accuracy compared to the conventional art.

Another object of the invention is to identify a receiving mode with correctness and accuracy without the need for judging regularity or validity of each slot included in each frame.

Another object of the invention is to identify a receiving mode properly or accurately without the need for judging regularity or validity of each slot included in each frame as long as a channel control procedure is properly performed and an operand to be referred to during the course of the channel control is given with high reliability.

Another object of the invention is to flexibly and accurately judge whether frame synchronization has been established according to a threshold value suitable for the substantial number of valid slots even in a case where the number of valid slots included in each frame may vary due to a difference of receiving modes or a deterioration in the transmission quality of a transmission path.

Another object of the invention is to enable adaptation to a variety of permutations of slots that can be included in each frame.

Still another object of the invention is to realize a reduction in hardware scale as the smaller the ratio of a possible maximum threshold value to a possible minimum threshold value becomes and the greater values to be used as threshold values become, compared to a case where the threshold values to be used in all receiving modes are to be given directly and individually.

Yet another object of the invention is to judge establishment of frame synchronization with flexibility and accuracy by using threshold values suitable for individual frame configurations and the number of slots even in a case where the word length of a slot or the number of bits in each of sync patterns distributed to slots is not constant.

A further object of the invention is to judge establishment of frame synchronization with flexibility and accuracy as long as the word length of a slot and the number of bits in each of sync patterns distributed to slots are identified under the above channel control even when the word length or the number of bits is not constant.

Another object of the invention is to easily perform a synchronism judgment adapted to each receiving mode unless the number of receiving modes or the number of slots that can be included in a frame received in each receiving mode is changed.

Another object of the invention is to independently judge establishment of frame synchronization at high speed even where threshold values to be used in all receiving modes are not necessarily given externally in a steady manner.

Another object of the invention is to reduce the sum of information amounts of threshold values to be used in all receiving modes including a prescribed receiving mode as the range of threshold values becomes smaller, irrespective of the total number of receiving modes.

Another object of the invention is to independently judge establishment of frame synchronization at high speed even where differences between threshold values to be used in receiving modes other than a prescribed receiving mode and a reference threshold value to be used as a threshold value in the prescribed receiving mode are not necessarily given externally in a steady manner.

Another object of the invention is to reduce the sum of information amounts of threshold values to be used in all receiving modes as the range of the threshold values becomes smaller, irrespective of the total number of receiving modes to be dealt with.

Another object of the invention is to independently judge establishment of frame synchronization at high speed even where ratios between threshold values to be used in receiving modes other than a prescribed receiving mode and a reference threshold value to be used as a threshold value in the prescribed receiving mode are not necessarily given externally in a steady manner.

Still another object of the invention is to enable flexible adaptation to various requirements relating to maintenance and operation.

Yet another object of the invention is to enable flexible adaptation to a variety of forms of receiving modes and permutations of valid slots that can be included in a frame to be received in each of the receiving modes.

A further object of the invention is to maintain high transmission quality and service quality and enable flexible adaptation to a variety of communication services and transmission rates, and the transmission information amount that may vary to a large extent in a communication system to which the invention is applied.

The above objects are achieved by a synchronism judgment apparatus where establishment of frame synchronization is judged on every frame received, by comparing magnitude of values between a threshold value and the number of error bits in bit strings that constitute sync patterns of consecutive slots to be included as a sequence in the frame concerned. A suitable receiving mode is identified from a normal receiving mode in which a frame as a sequence of consecutive slots in time series is received and a specific receiving mode in which a frame as a sequence of slots transmitted intermittently in time series is received. The threshold value is set smaller when the identified receiving mode is the specific receiving mode than when it is the normal receiving mode.

In the synchronism judgment apparatus, the smaller the number of slots that are or can be included in the frame becomes, the smaller the allowable number of error bits in sync patterns that are distributed to the slots is set.

The above objects are achieved by a synchronism judgment apparatus where the specific receiving mode may be a plurality of specific receiving modes in which frames having a different number of slots from each other are respectively received.

In the synchronism judgment apparatus, even when there are a plurality of specific receiving modes different from the normal receiving mode, the smaller the number of slots included in a frame received in a specific receiving mode becomes, the smaller the threshold value used as a reference in judging establishment of frame synchronization is set.

The above objects are attained by a communication system where threshold values to be used for identifying the above-mentioned normal receiving mode and specific receiving mode are given in advance; the establishment of frame synchronization is judged by comparing magnitude of values between a threshold value to be used for a desired receiving mode among the given threshold values and the number of bits having different values in a sync pattern of the desired receiving mode, compared to a value of an actually received sync pattern.

In the synchronism judgment apparatus, the smaller the number of slots that are or can be included in the frame becomes, the smaller the allowable number of error bits in sync patterns that are distributed to the slots is set.

The above objects are achieved by a communication system where the small value is a product or an approximate value of the product of the reference threshold value to be used in the normal receiving mode and a ratio between the number of slots included in a frame to be received in the specific receiving mode and the number of slots included in a frame to be received in the normal receiving mode.

In the communication system, a threshold value to be used in a receiving mode other than the prescribed receiving mode is given as a ratio signifying relative magnitude with respect to the threshold value to be used in the prescribed receiving mode.

The above objects are attained by a communication system where the normal receiving mode and the specific receiving mode are discriminated from each other according to differences in the configurations of frames received.

In this communication system, the receiving mode is identified properly or accurately without the need for judging regularity or validity of each slot included in the frame concerned as long as the value of a field with the above-mentioned configuration, among the fields of individual frames, is referred to with high reliability during the process of a prescribed communication control.

The above objects are achieved by a communication system where the normal receiving mode and the specific receiving mode are discriminated from each other based on a channel control procedure.

In the communication system, the receiving mode is identified properly or accurately without the need for judging regularity or validity of individual slots included in each frame as long as the channel control procedure is properly performed and an operand to be referred to during the process of the channel control is given with high reliability.

The above objects are attained by a communication system where the normal receiving mode and the specific receiving mode are discriminated from each other according to the number of valid slots actually included in a frame received.

In the communication system, it is possible to flexibly and accurately judge establishment of frame synchronization according to a threshold value suitable for a substantial value of the number of valid slots even in a case where the number of valid slots included in each frame may vary due to a difference of receiving modes or a deterioration in the transmission quality of a transmission path.

The above objects are achieved by a communication system where the normal receiving mode and the specific receiving mode are discriminated from each other according to the configurations of frames received and the number of slots actually included in the frame.

In the communication system, the receiving mode is identified according to not only the number of slots included in each received frame but also its configuration.

The above objects are realized by a communication system where the normal receiving mode and the specific receiving mode are discriminated from each other based on a channel control procedure and the number of valid slots actually included in the frame.

In the communication system, a threshold value to be used for judging establishment of frame synchronization is given according to not only the number of slots included in each received frame but also a channel control procedure.

The above objects are realized by a communication system where threshold values respectively suitable for the normal receiving mode and the specific receiving mode are given in advance and one of the threshold values which corresponds to the identified receiving mode is used.

In the communication system, a threshold value to be used for any of receiving modes is obtained without performing any special calculation.

The above objects are realized by a communication system comprising a storage section in which threshold values respectively suitable for the normal receiving mode and the specific receiving mode are registered in advance.

In the communication system, a threshold value to be used for any of receiving modes is obtained with promptness and high accuracy without performing any special calculation as long as proper values are written in advance to the storage section.

A reference threshold value to be used as a threshold value in one of the normal receiving mode and the specific receiving mode, and differences between the reference threshold value and threshold values to be used in respective receiving modes other than the one receiving mode are given in advance. The reference threshold value are used as a threshold value when the identified receiving mode is the one receiving mode, and the sum of the reference threshold value and a difference corresponding to a receiving mode other than the one receiving mode are used as a threshold value when the identified receiving mode is the receiving mode.

In the communication system, threshold values to be used in receiving modes other than the prescribed receiving mode are given as values relative to the reference threshold value to be used in the prescribed receiving mode.

The above objects are achieved by a communication system comprising a storage section in which either or both of a reference threshold value to be used as a threshold value in one of the normal receiving mode and the specific receiving mode and, differences between the reference threshold value and threshold values to be used in respective receiving modes other than the one receiving mode are registered in advance.

In the communication system, a threshold value to be used in any receiving mode is obtained with promptness and high accuracy without performing any special calculation as long as proper difference values are written in advance to the storage section.

The above objects are realized by a communication system where a reference threshold value to be used as a threshold value in one of the normal receiving mode and the specific receiving mode and ratios of threshold values to be used in respective receiving modes other than the one receiving mode to the reference threshold value are given in advance. The reference threshold value are used as a threshold value when the identified receiving mode is the one receiving mode, and the product of the reference threshold value and a ratio corresponding to a receiving mode other than the prescribed receiving mode are used as a threshold value when the identified receiving mode is the receiving mode.

In the communication system, threshold values to be used in receiving modes other than the prescribed receiving mode are given as ratios with respect to the reference threshold value to be used in the prescribed receiving mode.

The above objects are achieved by a communication system comprising a storage section in which either or both of a reference threshold value to be used in one of the normal receiving mode and the specific receiving mode and ratios between the reference threshold value and threshold values to be used in respective receiving modes other than the one receiving mode are registered in advance.

In the communication system, a threshold value to be used in any receiving mode is obtained with promptness and high accuracy without performing any special calculation as long as proper ratios are written in advance to the storage section.

The above objects are achieved by a communication system where either or both of writing and updating of values to be registered in the storage section are performed.

In the communication system, values to be registered in the storage section are written or updated when necessary through man-machine interfacing.

Writing and updating of values to be registered in all or part of the storage sections are performed under a channel control.

In the communication system, values to be registered in the storage section are written or updated every time a predetermined event is recognized during the process of a channel control.

The above objects are further achieved by a communication system comprising a section for performing either or both of forward alignment guard and backward alignment guard in accordance with a judgment result of establishment of frame synchronization. When the identified receiving mode is a certain receiving mode, the section is restricted from operating or results of the forward alignment guard and the backward alignment guard are vitiated.

In the communication system, the forward alignment guard and the backward alignment guard do not function effectively for a frame not including the number of consecutive slots larger than the number of stages of the forward alignment guard and the backward alignment guard.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3 is a list of frame forms;

FIG. 4 is a block diagram showing second to fourth embodiments of the invention;

FIG. 6 shows tables of various values to be used in accordance with the number of slots received;

FIG. 10 is a block diagram showing the configuration of an exemplary receiving part that is provided in a radio base station of a CDMA mobile communication system;

FIG. 11 shows a frame configuration;

FIG. 12 is a table showing sync patterns;

FIG. 13 is operation time charts (1) of a conventional example; and

FIG. 14 is operation time charts (2) of the conventional example.

DESCRIPTION OF THE PREFERRED EMBODIMENTS

Figure 1:
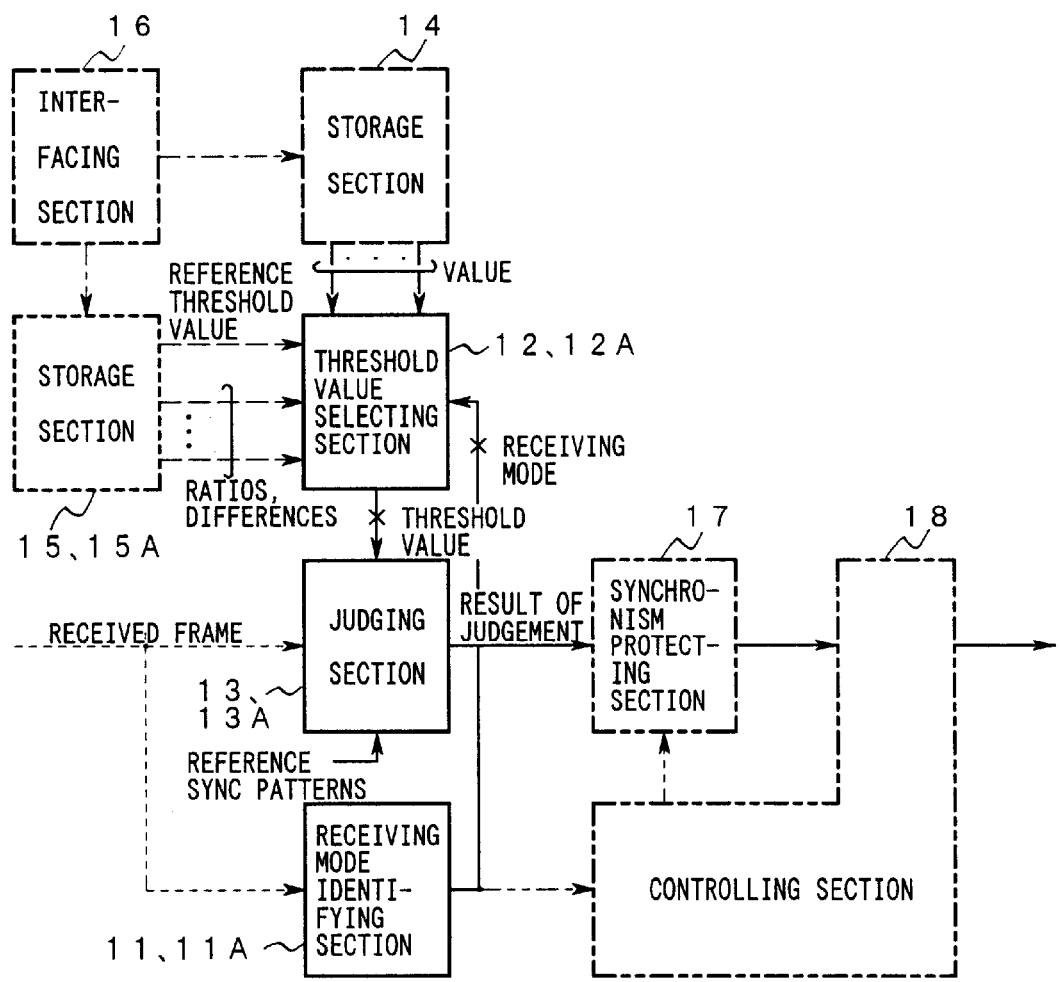
FIG. 1 is a block diagram showing the principles of the present invention.

The principles of synchronism judgment apparatuses and communication systems according to the present invention will be described below with reference to FIG. 1. FIG. 1 is a block diagram showing the principles of the invention.

Each of synchronism judgment apparatuses and communication systems shown in FIG. 1 is composed of a receiving mode identifying section 11 or 11A, a threshold value selecting section 12 or 12A, a judging section 13 or 13A, a storage section 14, 15, or 15A, an interfacing section 16, a synchronism protecting section 17, and a controlling section 18.

The principle of a first synchronism judgment apparatus according to the invention is as follows.

The receiving mode identifying section 11 identifies a receiving mode suitable for a frame actually received or to be received, from a normal receiving mode in which a frame as a sequence of consecutive slots arranged in order of time series is received and a specific receiving mode in which a frame as a sequence of slots transmitted intermittently is received. The threshold value selecting section 12 selects a threshold value corresponding to the receiving mode identified by the receiving mode identifying section 11 from a threshold value suitable for the normal receiving mode and a threshold value suitable for the specific receiving mode and smaller than the threshold value suitable for the normal receiving mode. The judging section 13 judges whether frame synchronization has been established, by comparing magnitude of values between the number of bits in sync patterns and the selected threshold value by the threshold value selecting section 12. The number of bits in the sync patterns is a number of bits in the sync patterns having different values compared to bits in known reference sync patterns. The sync patterns are dispersively distributed to respective slots included in the frame actually received or to be received.

In the synchronism judgment apparatus having the above configuration, the smaller the number of slots that are or can be included in the frame becomes, the smaller the allowable number of error bits in sync patterns that are distributed to the slots is set.

Therefore, it is possible to flexibly adapt to each receiving mode and accurately establish frame synchronization, compared to the conventional example in which a fixed threshold value is used independently of the receiving mode.

The principle of a second synchronism judgment apparatus according to the invention is as follows.

The receiving mode identifying section 11 individually identifies a plurality of specific receiving modes where frames having a different number of slots from each other are respectively received. The threshold value selecting section 12 selects small value as a threshold value in descending order of the number of slots that can be included in a frame received in the receiving mode identified by the receiving mode identifying section 11.

In the synchronism judgment apparatus having the above configuration, even in a case where there is a plurality of specific receiving modes different from the normal receiving mode, the smaller the number of slots included in a frame received in a specific receiving mode becomes, the smaller the threshold value used as a reference in judging establishment of frame synchronization is set.

This enables adaptation to a variety of permutations of slots that can be included in each frame.

The principle of a first communication system according to the invention is as follows.

The receiving mode identifying section 11A identifies a receiving mode, which is employed in the communication system, from a normal receiving mode in which a frame as a sequence of consecutive slots is received and a specific receiving mode in which a frame as a sequence of slots transmitted intermittently is received. The threshold value selecting section 12A at least has a first threshold value used for the normal receiving mode and a second threshold value used for the specific receiving mode and selects the first or second threshold value in accordance with an identification result obtained by the receiving mode identifying section 11A. The judging section 13A judges establishment of frame synchronization according to the threshold value selected by the threshold value selecting section 12A.

In the communication system having the above configuration, the smaller the number of slots that are or can be included in the frame becomes, the smaller the allowable number of error bits in sync patterns that are distributed to the slots is set.

This makes it possible to flexibly adapt to each receiving mode and accurately establish frame synchronization compared to the conventional example in which a fixed threshold value is used independently of the receiving mode.

The principle of a second communication system according to the invention is as follows.

The threshold value selecting section 12A selects, as a threshold value, a product or an approximate value of the product: a reference threshold value to be used as a threshold value in a prescribed receiving mode being one of the normal receiving mode and the specific receiving mode; and a ratio of the number of slots that can be included in a frame received in the receiving mode identified by the receiving mode identifying section 11A and the number of slots that can be included in a frame received in the prescribed receiving mode.

In this communication system, a threshold value to be used in a receiving mode other than the prescribed receiving mode is given as a ratio signifying relative magnitude with respect to the threshold value to be used in the prescribed receiving mode.

These enables a reduction in hardware scale compared to a case where threshold values to be used in all receiving modes are to be given directly and individually. The smaller the ratio of the possible maximum value of the threshold values to their possible minimum values becomes or the larger the number of values that can be selected as the threshold values becomes, the greater the reduction in hardware scale is made.

The principle of a third communication system according to the invention is as follows.

The receiving mode identifying section 11A identifies the receiving mode according to the configuration of a frame received.

In this communication system, the receiving mode is identified properly or accurately without judging whether each slot included in the frame concerned is regular or valid as long as the value of a field with the above-mentioned configuration among the fields of each frame is referred to with high reliability during the course of a prescribed communication control.

The principle of a fourth communication system according to the invention is as follows.

The receiving mode identifying section 11A identifies the receiving mode based on the procedure of a prescribed channel control.

In this communication system, the receiving mode is identified properly or accurately without the need for judging whether slots included in each frame are regular or valid as long as the channel control procedure is properly performed and an operand to be referred to during the course of the channel control is given with high reliability.

The principle of a fifth communication system according to the invention is as follows.

The receiving mode identifying section 11A identifies the receiving mode according to the number of slots actually included in a frame received.

In this communication system, it is possible to flexibly and accurately judge establishment of frame synchronization according to a threshold value suitable for a substantial value of the number of valid slots even in a case where the number of valid slots included in each frame may vary due to a difference of receiving modes or a deterioration in the transmission quality of a transmission path.

The principle of a sixth communication system according to the invention is as follows.

The receiving mode identifying section 11A identifies the receiving mode according to the configuration of a frame received and the number of slots actually included in the frame.

In this communication system, the receiving mode is identified according to not only the number of slots included in each received frame but also its configuration.

Therefore, even in a case where the word length of each slot or the number of bits in each of sync patterns distributed to slots is not constant, establishment of frame synchronization can be judged flexibly and accurately by using a threshold value suitable for the frame configuration and the number of slots.

The principle of a seventh communication system according to the invention is as follows.

The receiving mode identifying section 11A identifies the receiving mode based on a prescribed channel control procedure and the number of slots actually included in a frame received.

In this communication system, a threshold value to be used for judging establishment of frame synchronization is given according to not only the number of slots included in each received frame but also a channel control procedure.

Therefore, it is possible to flexibly and accurately judge establishment of frame synchronization even in a case where the word length of each slot or the number of bits in each of sync patterns distributed to slots is not constant, as long as the word length and the number of bits are identified under the above channel control.

The principle of an eighth communication system according to the invention is as follows.

The threshold value selecting section 12A selects, as a threshold value, a value corresponding to the receiving mode that is identified by the receiving mode identifying section 11A, from values that are given in advance as threshold values suitable for the normal receiving mode and the specific receiving mode, respectively.

In this communication system, a threshold value to be used for either receiving mode is given without performing any special calculation.

Therefore, it is able to easily perform a synchronism judgment adapted to each receiving mode unless the number of receiving modes or the number of slots that can be included in a frame received in each receiving mode is changed.

The principle of a ninth communication system according to the invention is as follows.

Values to be used as threshold values suitable for the normal receiving mode and the specific receiving mode, respectively, are registered in advance in the storage section 14. The threshold value selecting section 12A selects, as a threshold value, a value corresponding to the receiving mode that is identified by the receiving mode identifying section 11A, from the values registered in advance in the storage section 14.

In this communication system, a threshold value to be used for either receiving mode is obtained with promptness and high accuracy without the need for performing any special calculation as long as proper values are written in advance to the storage section 14.

Therefore, even where threshold values are not necessarily given externally in a steady manner, establishment of frame synchronization is judged independently at high speed.

The principle of a tenth communication system according to the invention is as follows.

The threshold value selecting section 12A is given in advance a reference threshold value to be used as a threshold value in a prescribed receiving mode being one of the normal receiving mode and the specific receiving mode, and differences between the reference threshold value and threshold values to be used in respective receiving modes other than the prescribed receiving mode, The threshold value selecting section 12A selects, as a threshold value, the reference threshold value when the identified receiving mode is the prescribed receiving mode, and selects, as a threshold value, the sum of the reference threshold value and a difference corresponding to a receiving mode other than the prescribed receiving mode when the identified receiving mode is the receiving mode.

In this communication system, threshold values to be used in receiving modes other than the prescribed receiving mode are given as values relative to the reference threshold value to be used in the prescribed receiving mode.

Therefore, irrespective of the total number of receiving modes, the smaller the range of the threshold values becomes, the smaller the sum of information amounts of threshold values to be used in all receiving modes including the prescribed receiving mode becomes.

The principle of an eleventh communication system according to the invention is as follows.

Differences between a reference threshold value to be used in a prescribed receiving mode being one of the normal receiving mode and the specific receiving mode, and threshold values to be used in respective receiving modes other than the prescribed receiving mode are registered in advance in the storage section 15. The threshold value selecting section 12A selects, as a threshold value, the reference threshold value when the identified receiving mode by the receiving mode identifying section 11A is the prescribed receiving mode, and selects, as a threshold, a sum of the reference threshold value and a difference corresponding to a receiving mode other than the prescribed receiving mode among the differences registered in the storage section 15 when the identified receiving mode by the receiving mode identifying section 11A is the receiving mode.

In this communication system, a threshold value to be used in any receiving mode is obtained with promptness and high accuracy without the need for performing any special calculation as long as proper difference values are written in advance to the storage section Therefore, even when differences are not necessarily given externally in a steady manner, establishment of frame synchronization is judged independently at high speed.

The principle of a twelfth communication system according to the invention is as follows.

The threshold value selecting section 12A is given in advance a reference threshold value to be used as a threshold value in a prescribed receiving mode being one of the normal receiving mode and the specific receiving mode and ratios of threshold values to be used in respective receiving modes other than the prescribed receiving mode to the reference threshold value. The threshold value selecting section 12A selects, as a threshold value, the reference threshold value when the identified receiving mode by the receiving mode identifying section 11A is the prescribed receiving mode, and selects, as a threshold value, the product of the reference threshold value and a ratio corresponding to a receiving mode other than the prescribed receiving mode when the identified receiving mode by the receiving mode identifying section 11A is the receiving mode.

In this communication system, threshold values to be used in receiving modes other than the prescribed receiving mode are given as ratios with respect to the reference threshold value to be used in the prescribed receiving mode.

Therefore, irrespective of the total number of receiving modes, the narrower the range of the threshold values becomes, the smaller the sum of information amounts of threshold values to be used in all receiving modes including the prescribed receiving mode becomes.

The principle of a thirteenth communication system according to the invention is as follows.

Ratios of a reference threshold value to be used in a prescribed receiving mode being one of the normal receiving mode and the specific receiving mode to threshold values to be used in respective receiving modes other than the prescribed receiving mode are registered in advance in the storage section 15A. The threshold value selecting section 12A selects, as a threshold value, the reference threshold value when the identified receiving mode by the receiving mode identifying section 11A is the prescribed receiving mode, and selects, as a threshold value, a product of the reference threshold value and a ratio corresponding to a receiving mode other than the prescribed receiving mode among the ratios registered in the storage section 15A when the identified receiving mode by the receiving mode identifying section 11A is the receiving mode.

In this communication system, a threshold value to be used in any receiving mode is obtained with promptness high accuracy without the need for performing any special calculation as long as proper ratios are written in advance to the storage section 15A.

Therefore, even where ratios are not necessarily given externally in a steady manner, establishment of frame synchronization is judged independently at high speed.

The principle of a fourteenth communication system according to the invention is as follows.

The interfacing section 16 performs either or both of writing and updating of values to be registered in all or part of the storage section 14, 15, and 15A.

In this communication system, values to be stored in all or part of the storage section 14, 15, and 15A are written or updated when necessary through man-machine interfacing performed by the interfacing section 16 and an apparatus that is connected to the system via the interfacing section 16.

This enables flexible adaptation to various requirements relating to maintenance and operation.

The principle of a fifteenth communication system according to the invention is as follows.

The interfacing section 16 performs either or both of writing and updating of values to be registered in all or part of the storage section 14, 15, and 15A under a channel control.

In this communication system, values to be stored in all or part of the storage section 14, 15, and 15A are written or updated every time a prescribed event is recognized during the course of a channel control.

This enables flexible adaptation to various requirements relating to maintenance and operation.

The principle of a sixteenth communication system according to the invention is as follows.

The synchronism protecting section 17 performs either or both of forward alignment guard and backward alignment guard in accordance with a judgment result obtained by the judging section 13A. The controlling section 18 restricts either or both of the forward alignment guard and the backward alignment guard to be performed by the synchronism protecting section 17 or vitiates a result of either or both of the forward alignment guard and the backward alignment guard when the identified receiving mode is a certain receiving mode.

In this communication system, the forward alignment guard and the backward alignment guard do not function effectively for a frame not including the number of consecutive slots larger than the number of stages of the forward alignment guard and the backward alignment guard.

This enables flexible adaptation to a variety of forms of receiving modes and permutations of valid slots that can be included in a frame to be received in each receiving mode.

Embodiments of the invention will be hereinafter described in detail with reference to the drawings.

Figure 2:
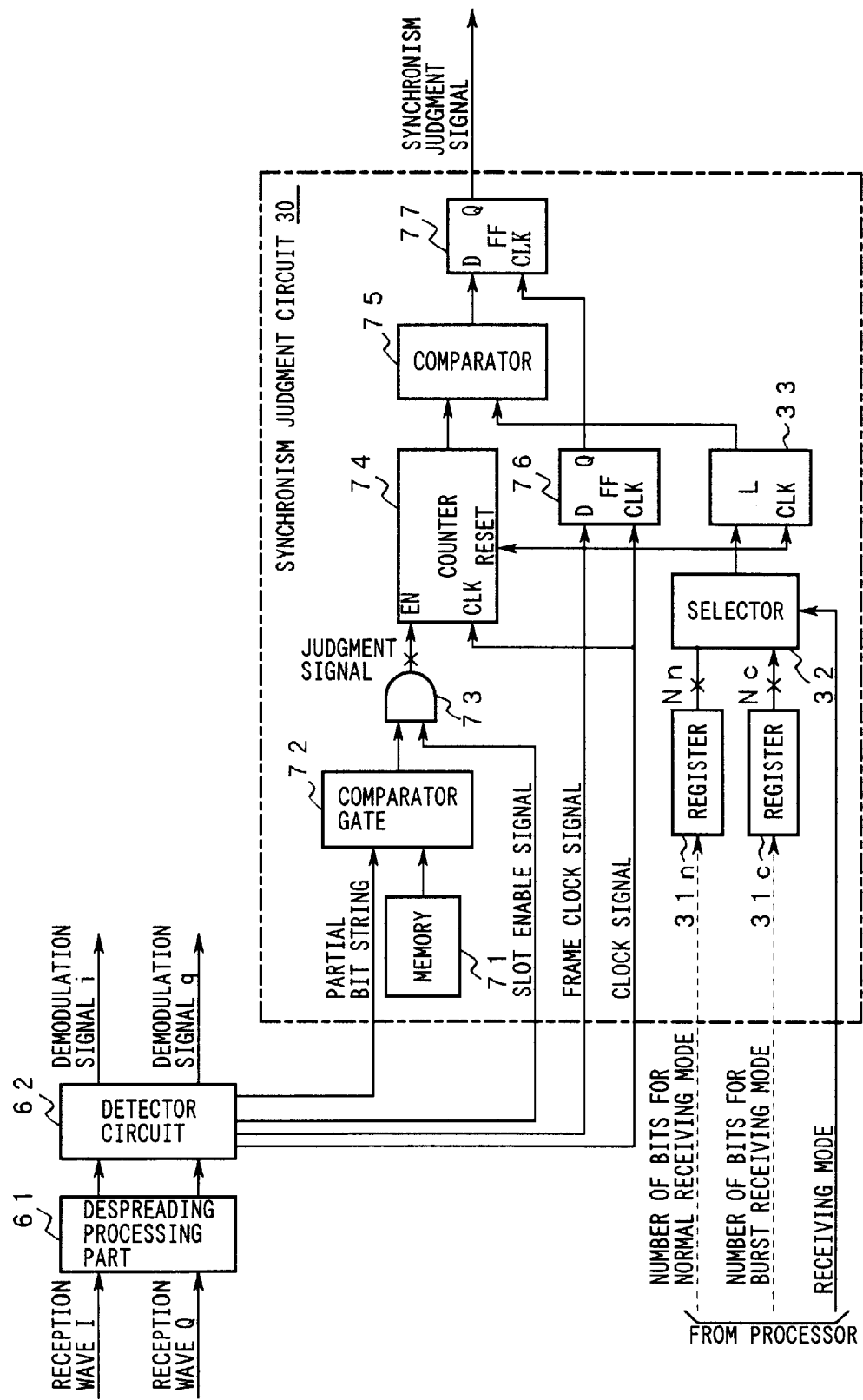
FIG. 2 is a block diagram showing a first embodiment of the invention.

FIG. 2 is a block diagram showing a first embodiment of the invention. The components in FIG. 2 having the same function and configuration as the corresponding components in FIG. 10 are given the same reference symbols as the latter and will not be described.

This embodiment is mainly different from the conventional example shown in FIG. 10 in the configuration of a synchronism judgment circuit 30 that replaces the synchronism judgment circuit 70.

The synchronism judgment circuit 30 is different in configuration from the synchronism judgment circuit 70 in that the following components are added:

A register 31n that holds the number of bits Nn that should be used as the number of bits Nb in the normal receiving mode A register 31c that holds the number of bits Nc that should be used in a similar manner in the compressed mode.

A selector 32 having a selection input that is connected to a specific output port of a processor (not shown) that performs a channel control and two inputs that are connected to the respective outputs of the registers 31n and 31c.

A latch (L) 33 having an input that is directly connected to the output of the selector 32, a clock terminal CLK to which the above-mentioned frame clock signal is supplied, and an output Q that is directly connected to one of the two inputs of the comparator 75.

The operation of this embodiment will be described below.

The form of every frame that can be received is represented by one of slot identifiers "0" "0A," "0B," "1," "2," "2A," "2B," "3," "4," "5," "5A," and "5B" (see FIG. 3) that is accommodated in a prescribed field of the frame concerned.

Further, as shown in FIG. 3, the number of bits (hereinafter referred to simply as "pilot word length") to be accommodated in the pilot bit field and the number of slots that are or can be packed in a frame concerned (hereinafter referred to simply as "the number of valid slots") are set at values suitable for the associated slot form.

For example, the number of bits Nn (=10) to be used as the above-described number of bits Nb in the continuous receiving mode in which 15 slots are packed steadily in each frame as in the cases of the slot forms represented by the slot identifiers "0," "2," and "5" is stored in advance in the register 31n.

Further, for example, in the register as shown in FIG. 3 by halftone dot meshing, the number of bits Nc (=5) to be used likewise as the number of bits Nb in the burst receiving mode or the compressed mode is stored in advance 31c in the slot identifier "0B," "2A," "2B," "5A," or "5B" where the product (hereinafter referred to simply as "total number of bits") of the pilot word length and the number of valid slots may be smaller than "45" that is equivalent to a half of a maximum value "90" (=6 bits×15) in the continuous receiving mode.

The processor (not shown) identifies a receiving mode that is one of the continuous receiving mode, the burst receiving mode, and the compressed mode according to a channel control procedure, and supplies the selector 32 with a binary selection signal indicating whether the receiving mode is the continuous receiving mode or not.

The selector 32 outputs, as the number of bits Nb, one, corresponding to the selection signal, of the numbers Nn and Nc that are stored in the respective registers 31n and 31c.

The latch 33 holds the number of bits Nb at a leading edge of the frame clock signal that indicates the head of a succeeding frame and supplies the number of bits Nb to the comparator 75.

The processing that is performed through cooperation among the memory 71, the comparators 72 and 75, the AND gate 73, the counter 74, and the flip-flops 76 and 77 is the same as in the conventional example shown in FIG. 10 and hence will not be described.

As described above, in this embodiment, in a period of the burst receiving mode or the compressed mode in which the total number of bits may be smaller than a prescribed threshold value, the number of bits Nb is set smaller than that in a period of the continuous receiving mode.

Therefore, whether frame synchronization has been established can be judged more accurately, the service quality is made higher, and the channel control is made more proper than in the conventional example in which the number of bits Nb is fixed independently of the receiving mode. in this embodiment, the fixed number "5" is stored in the register 31c as the number Nc though the number of slots that can be received for each frame in the burst receiving mode or the compressed mode is not constant.

However, the invention is not limited to such a case. For example, the number Nc that should be stored in the register 31c may be set in one of the following manners:

Where the number of slots that are received for each frame in the burst receiving mode or the compressed mode is equal to a known constant K, a number Nc that is given by the following equation to the constant K and the number of bits Nn that should be used as the number of bits Nb in the continuous receiving mode or an approximate value of the number Nc is set:

$$Nc = Nn \cdot K/15$$

Where the number of valid slots may vary in the burst receiving mode or the compressed mode, the number of bits Nc that is computed according to the above equation for the number K of slots that are counted in the same manner as in a second embodiment (described below) or an approximate number of the number Nc is set.

FIG. 4 is a block diagram showing second to fourth embodiments of the invention. The components in FIG. 4 having the same function and configuration as the corresponding components in FIG. 2 are given the same reference symbols as the latter and will not be described.

This embodiment is mainly different from the first embodiment shown in FIG. 2 in the configuration of a synchronism judgment circuit 40 that replaces the synchronism judgment circuit 30.

The synchronism judgment circuit 40 is different in configuration from the synchronism judgment circuit 30 in that the following components are provided:

A memory 41 that replaces the registers 31n and 31c and the selector 32.

A counter 42 having an output that is directly connected to the address input of the memory 41 and an enable terminal EN, a clock terminal CLK, and a reset terminal RESET to which the above-described slot enable signal, clock signal, and frame clock signal are supplied, respectively.

Figure 5:
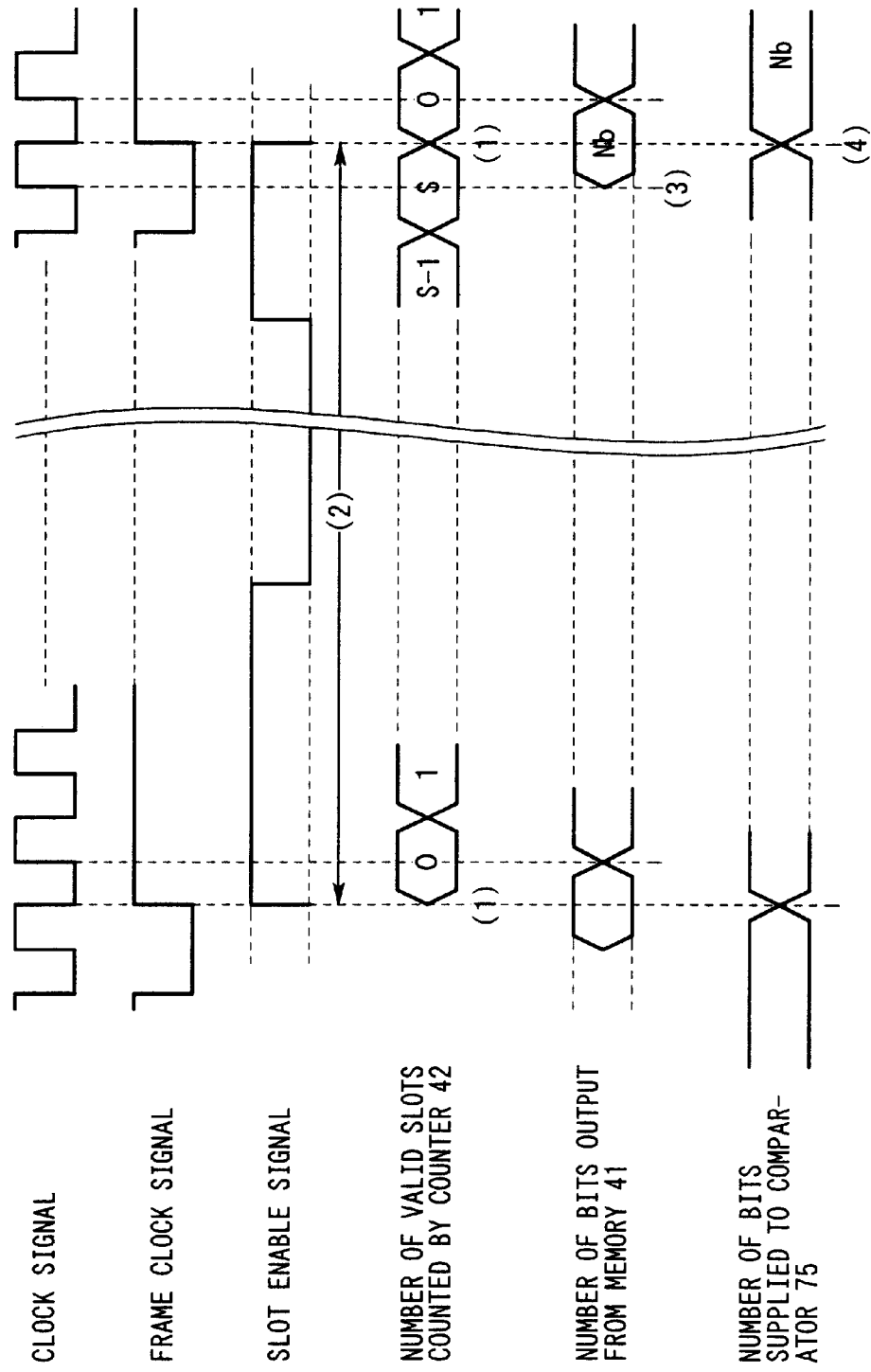
FIG. 5 is an operation time chart of the second embodiment of the invention.

FIG. 5 is an operation time chart of the second embodiment of the invention. The operation of the second embodiment of the invention will be described below with reference to FIGS. 4 and 5.

As shown in FIG. 6A, the memory 41 has storage areas corresponding to the respective numbers S (=0–15) of slots that are actually received for each frame. The above-described numbers Nn (=10) and Nc (=5) are stored in advance in those storage areas in such a manner that the number Nn corresponds to the number of slots S "15" and the number Nc corresponds to numbers S that are smaller than "15."

The counter 42 is reset at trailing edges of the frame clock signal (indicated by symbol (1) in FIG. 5) and counts clock signals only in periods (indicated by symbol (2) in FIG. 5) when the slot enable signal has a logical value "1" and a certain valid slot is received. In this manner, the counter 42 determines the number of slots on a frame-by-frame basis.

The memory 41 outputs a number (either Nn or Nc) that is stored in a storage area corresponding to the thus-determined number S (=0–15) of slots among the above-mentioned storage areas (indicated by symbol (3) in FIG. 5), and supplies, as the number of bits Nb, Nn or Nc to the comparator 75 via the latch 33 in the same manner as in the first embodiment (indicated by symbol (4) in FIG. 5).

That is, instead of above-mentioned receiving mode, the number of slots that are packed in each frame and actually received is identified and the number of bits Nb is updated as applicable to a value suitable for the number of slots.

Therefore, in this embodiment, whether frame synchronization has been established is judged properly based on the number of bits Nb that is suitable for a receiving mode even in any of the following cases:

The above-mentioned processor does not identify a receiving mode or cannot output a result of receiving mode identification.

The slot identifier is one of "0A," "0B," "1," "2A," "2B," "3," "4," "5A," and the number of valid slots actually received for each frame may vary.

The number of valid slots actually received for each frame may vary due to a fluctuation in the transmission characteristics of a radio transmission path or some other factor.

Figure 7:
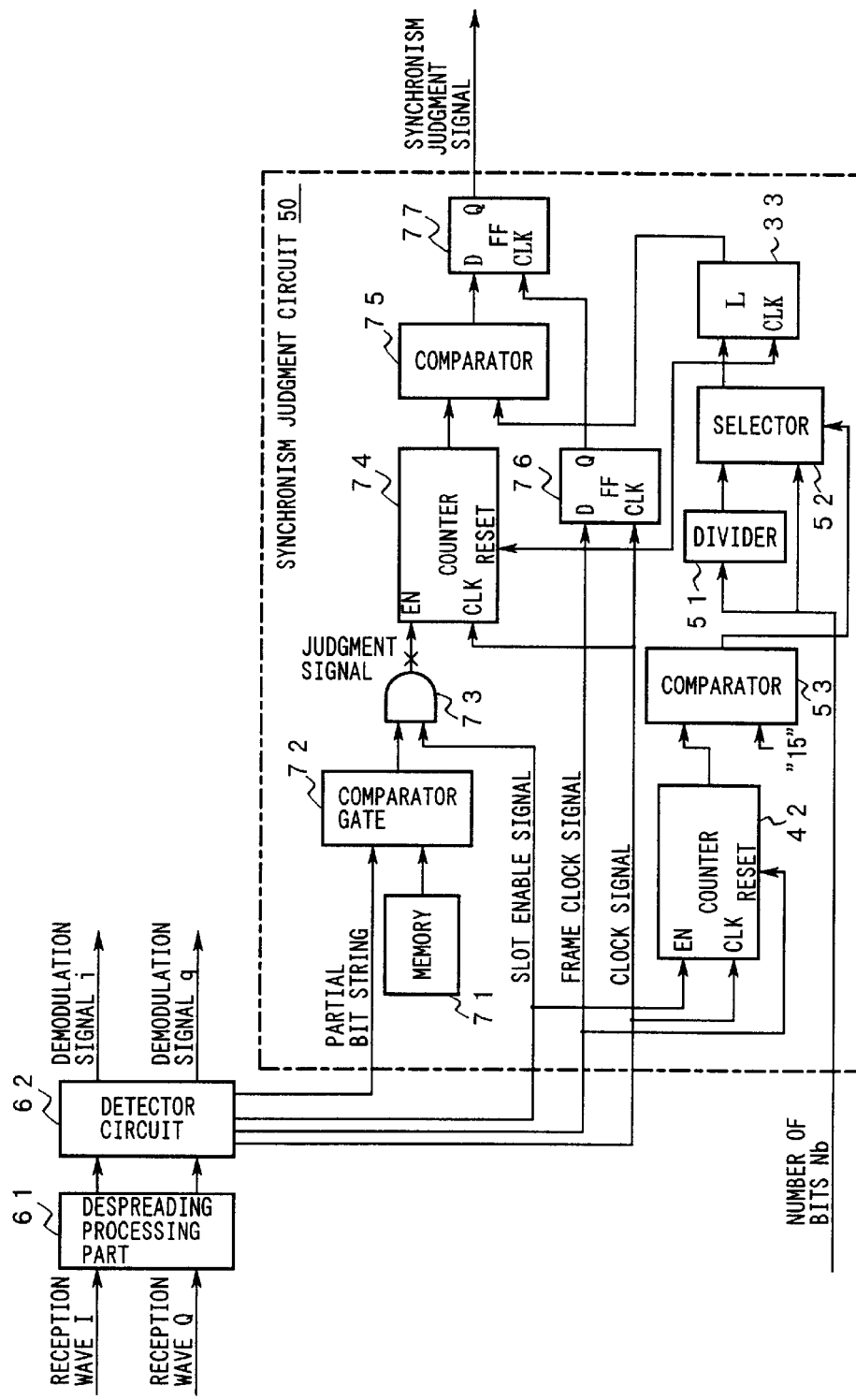
FIG. 7 is a block diagram (1) showing a modification of the second embodiment of the invention.

FIG. 7 is a block diagram (1) showing a modification of the second embodiment of the invention. The components in FIG. 7 having the same function and configuration as the corresponding components in FIG. 4 are given the same reference symbols as the latter and will not be described.

This modification is mainly different from the second embodiment shown in FIG. 4 in the configuration of a synchronism judgment circuit 50 that replaces the synchronism judgment circuit 40.

The synchronism judgment circuit 50 is different in configuration from the synchronism judgment circuit 40 in that the following components are provided in place of the memory 41:

A divider 51 having an input that is connected to a prescribed output port of the above-mentioned processor (not shown).

A selector 52 having one input that is connected to the above-mentioned output port together with the input of the divider 51 and the other input that is directly connected to the output of the divider 51.

A comparator 53 having one input to which the output of the counter 42 is directly connected, the other input to which the number "15" of slots that should be received for each frame in the continuous receiving mode is supplied, and an output that is directly connected to the selection input of the selector 52.

The operation of this modification will be described with reference to FIG. 7.

The selector 52 is supplied in parallel with the number of bits Nb that is directly supplied from the processor and should be used in the continuous receiving mode as well as the number of bits (for simplicity, it is assumed equal to the above-mentioned number Nc) that is obtained by the divider 51's dividing the number of bits Nb by "2."

As in the case of the second embodiment shown in FIG. 4, the counter 42 counts the number of valid slots that are actually received for each frame.

The comparator 53 judges whether the number of slots is equal to "15" and supplies the selector 52 with binary information indicating the judgment result.

The selector 52 supplies the comparator 75 via the latch 33 with the number of bits Nb when the judgment result is true and with the number Nc when the judgment result is false.

Therefore, in this modification, as long as the value to be used as the number of bits Nb is common to receiving modes other than the continuous receiving mode, the divider 51, the selector 52, and the comparator 53, which are smaller in hardware scale and consumes less power than the memory 41 shown in FIG. 4, are used and hence the reliability is increased and the running cost can be reduced.

In this modification, of the two numbers (the number of bits) supplied to the selector 52, one is supplied from the processor and the other is from the divider 51 that divides the one number by "2."

Figure 8:
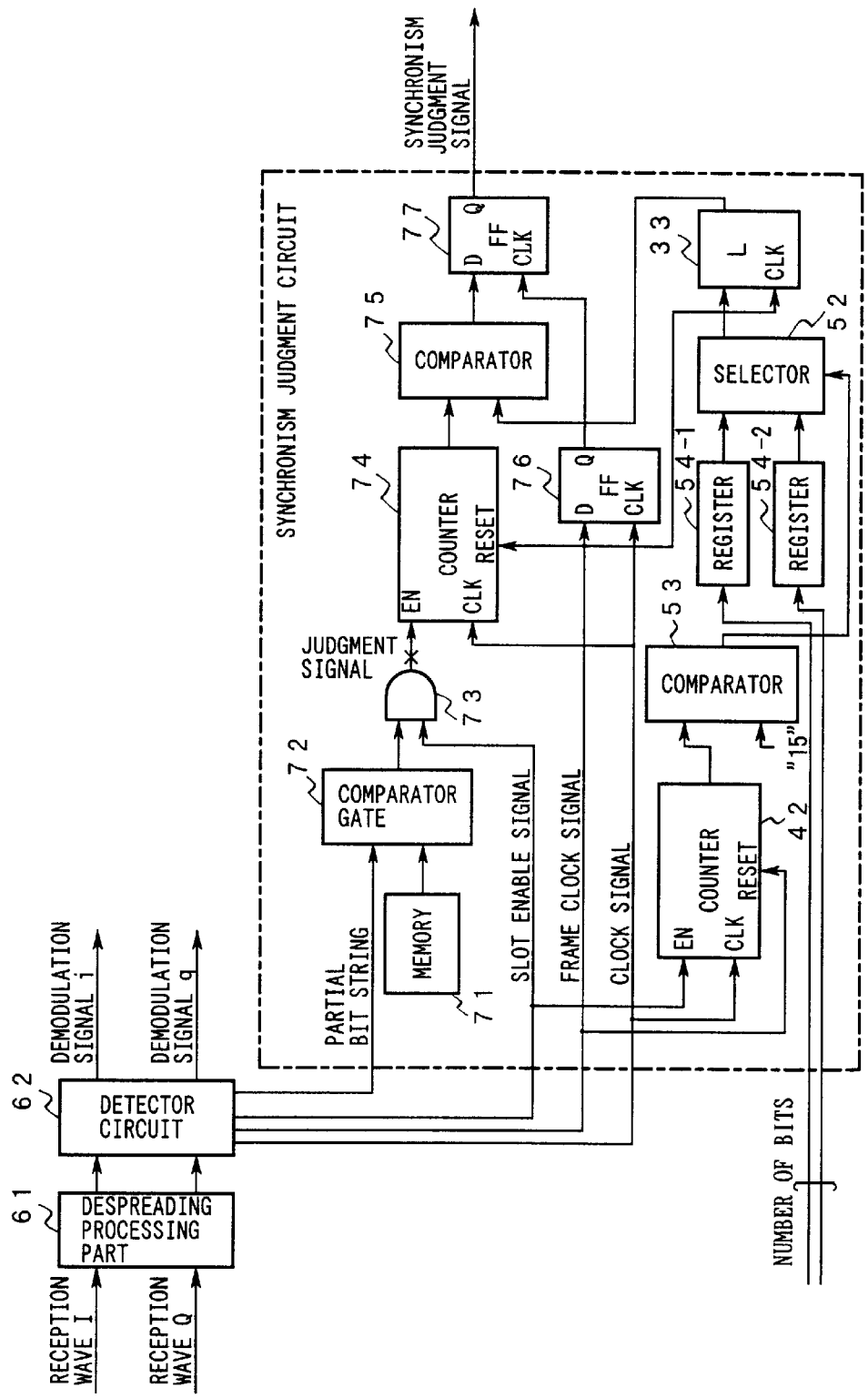
FIG. 8 is a block diagram (2) showing another modification of the second embodiment of the invention.

However, the invention is not limited to such a configuration. For example, as shown in FIG. 8, the two numbers may be stored in respective registers 54-1 and 54-2 or updated by the processor when necessary.

The third embodiment of the invention will be described below.

This embodiment is mainly different in configuration from the second embodiment shown in FIG. 4 in that a memory 41A is provided in place of the memory 41 and that an extended address is supplied from the processor to a specific address input of the memory 41A as indicated by a broken line in FIG. 4.

The operation of the third embodiment of the invention will be described below with reference to FIG. 4 and FIG. 6, table B.

This embodiment is different from the second embodiment shown in FIG. 4 in information that is stored in advance in the memory 41A and a procedure of the following processing that is performed by the processor.

As shown in FIG. 6, table B, numbers that should be used as the number of bits Nb are stored in advance in the memory 41A in such a manner as to correspond to combinations of the numbers S of slots counted for each frame by the counter 42 and extended addresses (mentioned above).

The processor identifies a form according to which the number of bits Nb to be used based on a prescribed channel control procedure should be set or updated, and supplies an extended address indicating the identified form to the memory 41A.

As in the case of the second embodiment, the memory 41A outputs a number stored in advance as corresponding to the number of slots counted by the counter 42 and the extended address, and supplies the number as the number Nb to the comparator 75 via the latch 33.

That is, the number of bits Nb is updated when necessary to a value that is suitable for not only the number of valid slots that are actually received for each frame but also the above-mentioned form that is determined according to the channel control procedure.

Therefore, in this embodiment, the synchronism judgment is performed according to not only the number of slots actually received via a radio transmission path but also the number of bits flexibly adapted to various events and a request that are identified under a channel control.

In this embodiment, the above-mentioned extended address is supplied according to the procedure of a channel control by the processor.

However, the invention is not limited to such a configuration. For example, desired levels of service quality and transmission quality may be attained by supplying an extended address based on various kinds of processing procedures and information such as forms of frames and slots actually received, a call processing procedure, and office data, subscriber data, and a call type that were referred to during the course of the call processing.

The fourth embodiment of the invention will be described below.

This embodiment is mainly different in configuration from the second embodiment shown in FIG. 4 in that a memory 41B is provided in place of the memory 41 and that a subtracter 43 having one input to which a reference value (described later) is supplied is provided between the memory 41B and the latch 33.

The operation of this embodiment will be described below with reference to FIG. 4 and FIG. 6, table C.

The one input of the subtracter 43 is given in advance a reference value that is equal to the number (=10) that should be supplied to the comparator 75 as the number of bits Nb in the continuous receiving mode.

As shown in FIG. 6 table C, instead of the number of bits to be supplied to the comparator 75 in accordance with the number S of slots actually received for each frame, differences obtained by subtracting the above number from the reference value are registered in advance in the memory 41B.

The memory 41B outputs a difference corresponding to the number S of slots counted by the counter 42 among the above differences.

The subtracter 43 subtracts the difference above from the reference value and thereby supplies a number that is equal to a corresponding number of bits Nb shown in FIG. 6A to the comparator 75 via the latch 33.

Since the differences are smaller than the number of bits Nb shown in FIG. 6 table A, the amount of information to be stored in the memory 41B is substantially reduced.

Therefore, in this embodiment, even in a case where the number of slots to be received for each frame varies to a large extent and the number of bits Nb to be supplied to the comparator 75 should be updated accurately in accordance with the number of slots, the hardware scale and the power consumption are saved and the reliability is kept high.

In this embodiment, all differences to be registered in the memory 41B are positive numbers.

However, the invention is not limited to such a configuration. For example, where it is allowable that the storage capacity of the memory 41B is not reduced or the reduction in its storage capacity is small, a configuration is possible in which an adder is provided in place of the subtracter 43 and differences to be registered in the memory 41B are negative numbers.

In this embodiment, values to be registered in the memory 41B are not limited to above-mentioned differences. For example, where a multiplier or a divider is used in place of the subtracter 43, each of values to be registered in the memory 41B may be a ratio of one of the reference value and the number of bits to be supplied to the comparator 75 in accordance with the number of slots that are actually received for each frame to the other.

In this embodiment, a fixed number is given as the reference value.

However, the invention is not limited to such a configuration. For example, the reference value may be registered in the memory 41B together with differences and the scaling of the calculation performed by the subtracter 43 (or the above-mentioned multiplier or divider) may be adjusted as applicable in accordance with the number of slots received for each frame.

Further, the reference value may be supplied from the above-mentioned processor or updated as applicable.

Figure 9:
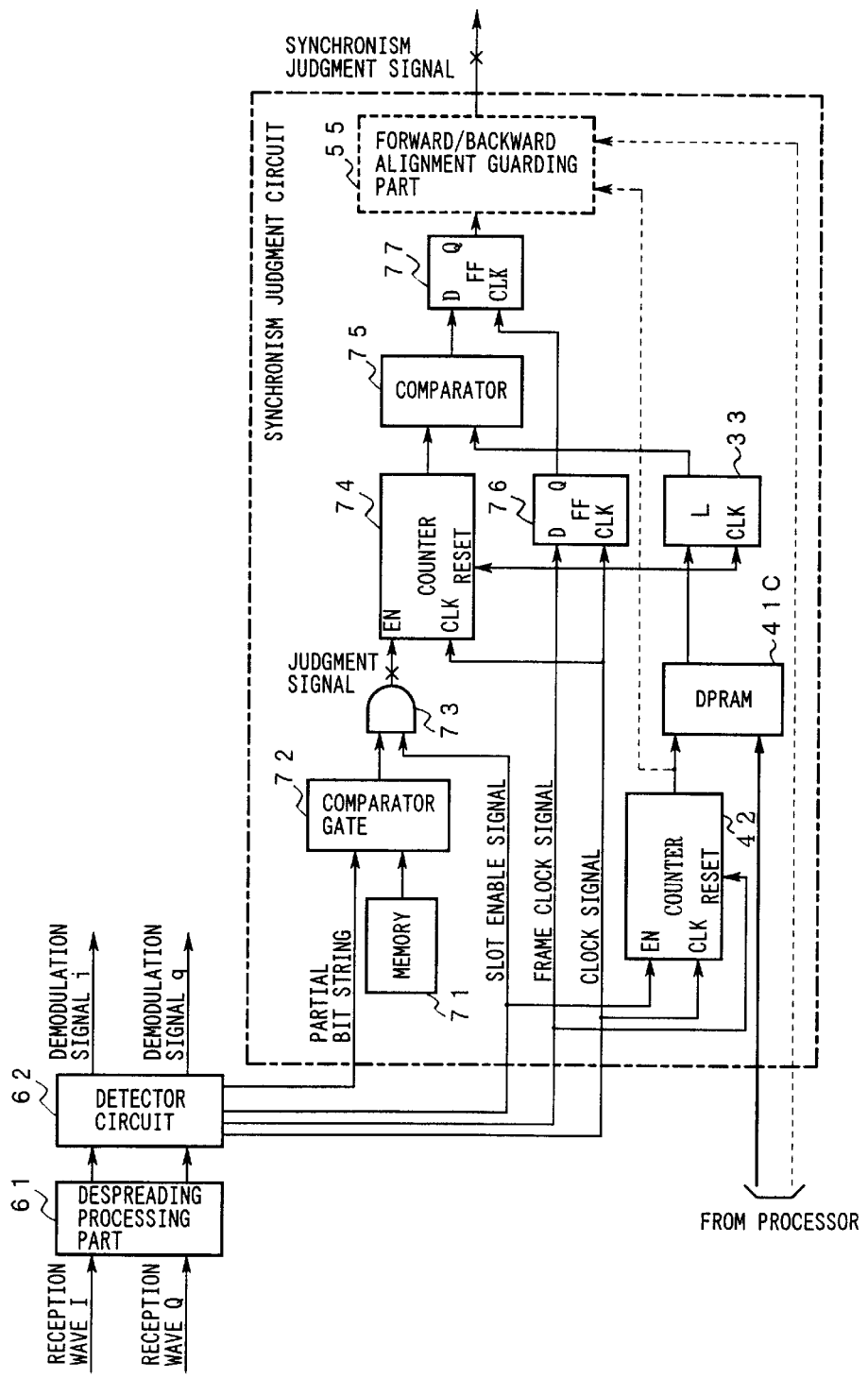
FIG. 9 is a block diagram showing fifth and sixth embodiment of the invention.

FIG. 9 is a block diagram showing the fifth and sixth embodiments of the invention.

The fifth and sixth embodiments are mainly different in configuration from the second embodiment shown in FIG. 4 in that in place of the memory 41 a dual-port RAM (DPRAM) 41C is provided that has a first port address input that is connected to the output of the counter 42, a read output that is directly connected to the input of the latch 33, and a second port address input to which a DMA channel or a specific output port of the above-mentioned processor is connected.

The operation of the fifth embodiment of the invention will be described below with reference to FIG. 9.

At the following time points, the processor writes a plurality of values that can be used as the number of bits Nb to the dual-port RAM 41C or updates values that were written in advance:

At the time of starting an operation

A time point when an event or a state is identified for or in which one number (as long as this embodiment is concerned, it may be a difference or a ratio as described in the fourth embodiment) to be used as a reference of synchronism judgment should be set or updated according to a channel control procedure.

A time point when an instruction to set or update one of the numbers of slots to be used as a reference of synchronism judgment is given by an operator.

The dual-port RAM 41C sequentially outputs values each corresponding to the number of slots counted by the counter 42 among the values that were written or updated in the above manner.

A value thus output is supplied to the comparator 75 via the latch 33 from the time point of the head of a frame that succeeds the above time point.

That is, in this embodiment, the values stored in the dual-port RAM 41C under the lead of the processor are updated as applicable. This enables flexible adaptation to requirements relating to the maintenance and operation of a radio transmission system to which the invention is applied.

In this embodiment, values to be written to the dual-port RAM 41C and values to which the stored values are updated are not described in a specific manner.

However, values to be written and values to which the stored values are updated may be any value as long as they enable adaptation to requirements relating to the above-mentioned maintenance and operation. Those values may be supplied from a mobile station via a radio transmission path or from another radio base station or a switching network via a prescribed communication link.

The sixth embodiment of the invention will be described below.

This embodiment is mainly different from the fifth embodiment in that a forward/backward alignment guarding part 55 having one control input to which a corresponding output port of the processor is connected and the other control input to which the output of the counter 42 is connected is provided as the final stage subsequent to the flip-flop 77 as indicated by a broken line in FIG. 9.

The operation of the sixth embodiment of the invention will be described below with reference to FIG. 9.

Where the processor allows forward alignment guard and backward alignment guard, the forward/backward alignment guarding part 55 judges whether the number of slots counted for each frame by the counter 42 is equal to "15" and performs forward alignment guard and backward alignment guard by performing prescribed processing on a synchronism judgment signal that is supplied from the comparator 75 via the latch 77 as long as the judgment result is true.

However, when the judgment result is false or the processor prohibits forward alignment guard and backward alignment guard, the forward/backward alignment guarding part 55 does not perform any processing that realizes forward alignment guard and backward alignment guard and outputs the synchronism judgment signal as supplied.

That is, forward alignment guard and backward alignment guard are performed properly only when a receiving mode etc. satisfy prescribed conditions. This enables flexible adaptation to zone configuration and channel allocation employed and various forms of transmission service to be realized.

In this embodiment, in a state that forward alignment guard and backward alignment guard are restricted, the synchronism judgment signal that is obtained at the output of the latch 77 is output from the apparatus through the forward/backward alignment guarding part 55.

However, the invention is not limited to such a configuration. For example, a configuration is possible in which the operation of the forward/backward alignment guarding part 55 is restricted and the synchronism judgment signal that is obtained at the output of the latch 77 is referred to directly.

In this embodiment, no description is made of processing to be performed by the processor to judge whether to allow or prohibit forward alignment guard and backward alignment guard.

However, such processing is not an essential feature of the invention and may be any processing performed during the course of a channel control or man-machine interfacing.

In this embodiment, the forward/backward alignment guarding part 55 judges, based on the number of slots counted for each frame, whether to perform forward alignment guard and backward alignment guard.

However, the invention is not limited to such a configuration. The forward/backward alignment guarding part 55 may directly judge whether a receiving mode that is identified in the above described manner is the continuous receiving mode (i.e., the receiving mode in which forward alignment guard and backward alignment guard should be performed) or may identifies and use a result of such a judgment that is supplied from the processor.

In each of the above embodiments, the invention is applied to the radio base station of a wide-band CDMA mobile communication system.

However, the invention is not limited to such a mobile communication system, and can be applied to a transmission system with any zone configuration, channel allocation, and multiple access as long as each frame to be received is formed as a sequence of consecutive slots and the number of slots may vary.

In each of the above embodiments, the invention is applied to the synchronism judgment of a control channel (DPCCH) that is accessed asynchronously by a plurality of mobile stations during the course of call setting.

However, the invention is not limited to the case involving such a control channel, and can be in the same way applied to a case involving a channel that is used for transmission of a speech signal as long as each frame to be received is formed as a sequence of consecutive slots and the number of slots can be changed.

In each of the above embodiments, the word length of slots that can be packed in each frame is fixed.

However, the invention is not limited to the case of using frames having such a configuration, and can be applied to a case of using frames having any configuration as long as sync patterns are dispersively distributed, in a known form, to respective slots that are packed in each frame and with a prescribed frame configuration the word length of each slot can be identified with high reliability.

Further, in each of the above embodiments, the number of bits Nb suitable for the number of slots received for each frame is determined and used in the continuous receiving mode, the burst receiving mode, and the compressed mode.

However, the invention is not limited to such a configuration. The number of receiving modes in each of which such the number of bits Nb is separately set may be any number that is greater than or equal to "2" or "4."

The invention is not limited to the above embodiments and various modifications may be made without departing from the spirit and the scope of the invention. Any improvement may be made in part or all of the components.

What is claimed is:

1. A synchronism judgment apparatus comprising:

a receiving mode identifying section for identifying a receiving mode suitable for a frame actually received or to be received, from a normal receiving mode wherein a frame as a sequence of consecutive slots is received and a specific receiving mode wherein a frame as a sequence of slots intermittently transmitted is received;

a threshold value selecting section for selecting a threshold value corresponding to said identified receiving mode from a threshold value suitable for said normal receiving mode and a threshold value suitable for said specific receiving mode and smaller than the threshold value suitable for said normal receiving mode; and a judging section for judging whether frame synchronization has been established, by comparing magnitude of values between number of bits in sync patterns and said selected threshold value, said number of bits in said sync patterns being a number of bits in said sync patterns having different values compared to bits in known reference sync patterns, and said sync patterns dispersively distributed to respective slots included in said frame actually received or to be received.

2. The synchronism judgment apparatus according to claim 1, wherein:

said receiving mode identifying section individually identifies a plurality of specific receiving modes wherein frames having a different number of slots from each other are respectively received; and said threshold value selecting section selects small value as a threshold value in descending order of the number of slots which can be included in a frame received in said identified receiving mode.

3. A communication system wherein establishment of frame synchronization is judged according to a comparison result between a threshold value and the number of bits having different values in sync patterns, compared to a value of bits in known reference sync patterns, said sync patterns included in a received frame, comprising:

a receiving mode identifying section for identifying a receiving mode employed in said communication system from a normal receiving mode wherein a frame as a sequence of consecutive slots is received and a specific receiving mode wherein a frame as a sequence of slots intermittently transmitted is received;

a threshold value selecting section at least having a first threshold value used for said normal receiving mode and a second threshold value used for said specific receiving mode, and for selecting the first or second threshold value in accordance with an identification result obtained by said receiving mode identifying section; and a judging section for judging whether frame synchronization has been established according to said selected threshold value.

4. The communication system according to claim 3, wherein said threshold value selecting section selects, as a threshold value, a product or an approximate value of the product of:

a reference threshold value to be used as a threshold value in a prescribed receiving mode being one of said normal receiving mode and said specific receiving mode; and a ratio of the number of slots that can be included in a frame received in said identified receiving mode to the number of slots that can be included in a frame received in said prescribed receiving mode.

5. The communication system according to claim 3, wherein said receiving mode identifying section identifies a receiving mode according to a configuration of a frame received.

6. The communication system according to claim 3, wherein said receiving mode identifying section identifies a receiving mode based on a prescribed channel control procedure.

7. The communication system according to claim 3, wherein said receiving mode identifying section identifies a receiving mode according to the number of slots actually included in a frame received.

8. The communication system according to claim 3, wherein said receiving mode identifying section identifies a receiving mode according to a configuration of a frame received and the number of slots actually included in the frame.

9. The communication system according to claim 3, wherein said receiving mode identifying section identifies a receiving mode according to a prescribed channel control procedure and the number of slots actually included in a frame received.

10. The communication system according to claim 3, wherein:

said threshold value selecting section is given in advance values to be used as threshold values respectively suitable for said normal receiving mode and said specific receiving mode; and selects a value, corresponding to said identified receiving mode as a threshold value, from the given values.

11. The communication system according to claim 3, further comprising a storage section wherein values to be used as threshold values respectively suitable for said normal receiving mode and said specific receiving mode are registered in advance, and wherein said threshold value selecting section selects, as a threshold value, a value corresponding to said identified receiving mode from said values registered in said storage section.

12. The communication system according to claim 3, wherein said threshold value selecting section:

is given in advance a reference threshold value to be used as a threshold value in said prescribed receiving mode, and a difference between the reference threshold value and a threshold value to be used in a receiving mode other than said prescribed receiving mode;

selects said reference threshold value as a threshold value when said identified receiving mode is said prescribed receiving mode; and selects, as a threshold value, a sum of said reference threshold value and a difference corresponding to a receiving mode other than said prescribed receiving mode when said identified receiving mode is the receiving mode other than said prescribed receiving mode.

13. The communication system according to claim 3, further comprising a storage section wherein differences between threshold values to be individually used in receiving modes other than said prescribed receiving mode and a reference threshold value to be used in said prescribed receiving mode are registered, and wherein said threshold value selecting section selects said reference threshold value as a threshold value when said identified receiving mode is said prescribed receiving mode, and selects, as a threshold value, a sum of said reference threshold value and a difference corresponding to a receiving mode other than said prescribed receiving mode among said differences registered in said storage section when said identified receiving mode is the receiving mode other than said prescribed receiving mode.

14. The communication system according to claim 3, wherein said threshold value selecting section:

is given in advance a reference threshold value to be used as a threshold value in said prescribed receiving mode and a ratio of a threshold value to be used in a receiving mode other than said prescribed receiving mode to the reference threshold value;

selects the reference threshold value as a threshold value when said identified receiving mode is said prescribed receiving mode; and selects, as a threshold value, a product of said reference threshold value and a ratio corresponding to a receiving mode other than said prescribed receiving mode when the identified receiving mode is the receiving mode other than said prescribed receiving mode.

15. The communication system according to claim 3, further comprising a storage section wherein ratios of threshold values to be individually used in receiving modes other than said prescribed receiving mode to a reference threshold value to be used in said prescribed receiving mode are registered, and wherein said threshold value selecting section selects said reference threshold value as a threshold value when said identified receiving mode is said prescribed receiving mode, and selects, as a threshold value, a product of said reference threshold value and a ratio corresponding to a receiving mode other than said prescribed receiving mode among the ratios registered in said storage section when said identified receiving mode is the receiving mode other than said prescribed receiving mode.

16. The communication system according to claim 11, further comprising interfacing section for performing either or both of writing and updating of values to be registered in said storage section.

17. The communication system according to claim 13, further comprising interfacing section for performing either or both of writing and updating of values to be registered in said storage section.

18. The communication system according to claim 15, further comprising interfacing section for performing either or both of writing and updating of values to be registered in said storage section.

19. The communication system according to claim 16, wherein said interfacing section performs writing and updating of values to be registered in said storage section under a channel control.

20. The communication system according to claim 17, wherein said interfacing section performs writing and updating of values to be registered in said storage section under a channel control.

21. The communication system according to claim 18, wherein said interfacing section performs writing and updating of values to be registered in said storage section under a channel control.

22. The communication system according to claim 3, further comprising:

synchronism protecting section for performing either or both of forward alignment guard and backward alignment guard according to a judgment result obtained by said judging section; and controlling section for restricting either or both of said forward alignment guard and said backward alignment guard, or vitiating a result obtained by either or both of said forward alignment guard and said backward alignment guard when said identified receiving mode is a certain receiving mode.

* * * * *